(12) United States Patent
Song

(10) Patent No.: US 12,301,965 B2
(45) Date of Patent: May 13, 2025

(54) DISTANCE MEASURING CAMERA DEVICE

(71) Applicant: LG Innotek Co., Ltd., Seoul (KR)

(72) Inventor: Young Kil Song, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 157 days.

(21) Appl. No.: 18/250,659

(22) PCT Filed: Oct. 27, 2021

(86) PCT No.: PCT/KR2021/015190
§ 371 (c)(1),
(2) Date: Apr. 26, 2023

(87) PCT Pub. No.: WO2022/092798
PCT Pub. Date: May 5, 2022

(65) Prior Publication Data
US 2024/0007728 A1  Jan. 4, 2024

(30) Foreign Application Priority Data

Oct. 27, 2020 (KR) .................. 10-2020-0140496

(51) Int. Cl.
*H04N 23/51* (2023.01)
*G03B 5/06* (2021.01)
*H04N 23/55* (2023.01)

(52) U.S. Cl.
CPC .............. *H04N 23/51* (2023.01); *G03B 5/06* (2013.01); *H04N 23/55* (2023.01)

(58) Field of Classification Search
None
See application file for complete search history.

(56) References Cited

U.S. PATENT DOCUMENTS

| 10,120,266 | B2 * | 11/2018 | Butterworth | ............ H01L 33/58 |
| 2017/0017056 | A1 * | 1/2017 | Park | .................. G02B 7/08 |

(Continued)

FOREIGN PATENT DOCUMENTS

| EP | 3 441 846 A2 | 2/2019 |
| JP | 2017-510841 A | 4/2017 |

(Continued)

OTHER PUBLICATIONS

International Search Report, dated Feb. 3, 2022, for PCT Application No. PCT/KR2021/015190.

(Continued)

*Primary Examiner* — Cynthia Segura
(74) *Attorney, Agent, or Firm* — Saliwanchik, Lloyd & Eisenschenk

(57) ABSTRACT

A distance measuring camera device, according to an embodiment of the present invention, comprises: a substrate; a light source and an image sensor disposed on the substrate; a first base disposed on the light source; a second base disposed on the image sensor; a housing coupled to the first base; and an optical unit disposed on the housing. The first base comprises a bottom portion and side walls disposed on the bottom portion, and further comprises: a first bonding member disposed between the bottom portion and the housing; and a second bonding member which is spaced apart from the first bonding member in the optical axis direction of the light source, and is disposed between the side walls and the housing.

20 Claims, 23 Drawing Sheets

(56) References Cited

U.S. PATENT DOCUMENTS

| | | | |
|---|---|---|---|
| 2020/0003870 A1 | 1/2020 | Chen et al. | |
| 2021/0136187 A1* | 5/2021 | Jeon | H04M 1/0264 |
| 2022/0116537 A1* | 4/2022 | Lee | H04N 23/57 |
| 2022/0206364 A1* | 6/2022 | Park | G03B 17/12 |
| 2022/0252961 A1* | 8/2022 | Park | H02K 41/0354 |
| 2023/0078421 A1* | 3/2023 | Han | G01S 17/10 |
| | | | 348/135 |

FOREIGN PATENT DOCUMENTS

| | | |
|---|---|---|
| KR | 10-2020-0030946 A | 3/2020 |
| KR | 10-2020-0073022 A | 6/2020 |
| KR | 20200077208 A | 6/2020 |
| KR | 20200085578 A | 7/2020 |
| KR | 20200086815 A | 7/2020 |
| KR | 20200117427 A | 10/2020 |
| WO | 2015133759 A1 | 9/2015 |
| WO | 2020/060219 A1 | 3/2020 |

OTHER PUBLICATIONS

Supplementary European Search Report dated Sep. 17, 2024 in European Application No. 21886792.7.
Office Action dated Feb. 5, 2025 in Korean Application No. 10-2020-0140496.

\* cited by examiner

140: 141, 142, 143, 144

(LOWEST DRIVING)   (HIGHEST DRIVING)

160: 161, 162

(a)  (b)

(a)  (b)

DISTANCE MEASURING CAMERA DEVICE

CROSS-REFERENCE TO RELATED APPLICATIONS

This application is the U.S. national stage application of International Patent Application No. PCT/KR2021/015190, filed Oct. 27, 2021, which claims the benefit under 35 U.S.C. § 119 of Korean Application No. 10-2020-0140496, filed Oct. 27, 2020, the disclosures of each of which are incorporated herein by reference in their entirety.

TECHNICAL FIELD

Embodiments relate to a distance measuring camera device.

BACKGROUND ART

Three-dimensional contents are applied in many fields, such as education, manufacturing, and autonomous traveling as well as games and culture, and a depth map is required to acquire the three-dimensional contents. The depth map is information representing a distance in space and represents perspective information on one point with respect to another point in a two-dimensional image. As a method of acquiring the depth map, a method of projecting infrared (IR) structured light on an object, a method using a stereo camera, a time of flight (TOF) method, etc. are used.

The TOF method or the structured light method uses light in an infrared wavelength range, and recently, attempts have been made to use for biometric authentication using the characteristics of the infrared wavelength range. For example, it is known that shapes of veins spread in fingers or the like have not changed since the fetus throughout life and vary from person to person. Therefore, patterns of the veins may be identified using a camera device equipped with an infrared light source. To this end, after the camera device captures fingers, the camera device may detect each finger by removing a background on the basis of colors and shapes of the fingers and extract a vein pattern of each finger from color information of each detected finger. In other words, an average color of the fingers, the colors of the veins spread in the fingers, and colors of wrinkles on the fingers may be different from each other. For example, the colors of the veins spread in the fingers may be little red compared to the average color of the fingers, and the colors of the wrinkles on the fingers may be darker than the average color of the fingers. An approximated value for the vein may be calculated for each pixel using these characteristics, and the patterns of the veins may be extracted using a calculated result. Then, an individual or user may be identified by comparing the extracted pattern of the vein of each finger with pre-registered data. As described above, distance measurement and position recognition are possible through light emission and light reception.

However, the camera device is required to increase the reliability for optical axis alignment, eye-safety, and an impact resistance.

TECHNICAL PROBLEM

Embodiments are directed to providing a distance measuring camera device that facilitates optical axis alignment.

Embodiments are directed to providing a distance measuring camera device allowing a human body or the like to be inhibited from being damaged by energy of an optical signal through increased reliability.

The object of embodiments is not limited thereto and may also include objects or effects that may be identified from the configurations or embodiments to be described below.

TECHNICAL SOLUTION

A distance measuring camera device according to an embodiment of the present invention includes a substrate, a light source and an image sensor disposed on the substrate, a first base disposed on the light source, a second base disposed on the image sensor, a housing coupled to the first base, and an optical part disposed in the housing, wherein the first base includes a bottom portion and a side wall disposed on the bottom portion, and further includes a first bonding member disposed between the bottom portion and the housing, and a second bonding member spaced apart from the first bonding member in an optical axis direction of the light source and disposed between the side wall and the housing.

The bottom portion may include a first groove disposed along an edge of a cavity of the first base, and the side wall may include a second groove in which the housing is seated.

The first groove may be disposed closer to an optical axis of the light source than the second groove may be. a base hole disposed inside thereof A width of the first groove may be different from a width of the second groove may be.

The first base and the second base may be integrally formed.

A height of the first base in the optical axis direction may be different from a height of the second base in the optical axis direction.

The second base may include a base opening located in a side surface thereof, a base hole disposed therein, and an application groove adjacent to the base opening to be in contact with the base hole.

The housing may include a housing bottom surface, and a housing side portion disposed on the housing bottom surface and including a stepped portion, the housing bottom surface may be disposed in the first groove, the stepped portion may be seated in the second groove and on the side wall.

A portion of the second groove may overlap the stepped portion in the optical axis direction.

A minimum distance in a region in which the second groove and the housing side portion do not overlap in the optical axis direction in a direction perpendicular to the optical axis may be greater than a minimum distance between an inner surface of the side wall and the housing in the direction perpendicular to the optical axis.

The base may include a first base side surface and a second base side surface positioned opposite to each other, the first base side surface may include a first base groove concave toward the inside of the base, and the second base side surface may include a second base groove concave toward the inside of the base.

The first base groove and the second base groove may not overlap in a direction perpendicular to the first base side surface and the second base side surface.

Any one of the first base groove and the second base groove may be positioned corresponding to an interface between the first base and the second base, and the other one of the first base groove and the second base groove may be located in the second base.

The second base may further include a base upper protrusion disposed on an upper surface thereof.

The distance measuring camera device may further include a cover configured to cover the base.

The cover may further include a blocking member overlapping the housing in the optical axis direction on the first base.

A camera device according to an embodiment includes a substrate, a light source and an image sensor disposed on the substrate, a first base disposed on the light source, a second base disposed on the image sensor, a housing coupled to the first base, and an optical part disposed in the housing, wherein the first base includes a bottom portion and a side wall disposed on the bottom portion, and the housing includes a side surface on which a stepped portion is formed, and includes a first bonding member disposed between the bottom portion and a lower surface of the housing, and a second bonding member disposed between the stepped portion and the side wall.

The optical part may move in an optical axis direction.

A camera device according to an embodiment includes a substrate, a light source disposed on the substrate, a first base disposed on the light source, a housing coupled to the first base, and an optical part disposed in the housing, wherein the first base includes a bottom portion and a side wall disposed on the bottom portion, and the housing includes a side surface on which a stepped portion is formed, and includes a first bonding member configured to bond between the bottom portion and a lower surface of the housing, and a second bonding member configured to bond between the stepped portion and the side wall.

The optical part may move in an optical axis direction.

A distance measuring camera device may include a first substrate, a first base disposed on the first substrate, a housing coupled to the first base, and a light emitting unit including an optical part disposed in the housing.

A light receiving unit in the distance measuring camera device may include a second substrate separated from the first substrate, an image sensor disposed on the second substrate, and a second base disposed on the second substrate and separated from the first base. Furthermore, the light receiving unit may further include a second cover.

In addition, the distance measuring camera device may include a single substrate or an integrated substrate without separating the first substrate and the second substrate. In addition, the separated first base and second base may be seated on the integrated substrate. In addition, the camera device may have only the second cover without the first cover or also have only the first cover without the second cover.

A main substrate, the base, and the cover in the distance measuring camera device may be formed with a separated structure or an integrated structure. When separated, each of the main substrate, the base, and the cover may correspond to one component of the light emitting unit and the light receiving unit.

ADVANTAGEOUS EFFECTS

According to embodiments, a camera device can be flexibly driven according to the demands of various applications by changing a light pattern of light or an optical signal according to various parameters such as a distance to an object, resolution, etc.

In addition, according to embodiments, it is possible to implement a camera device capable of facilitating optical axis alignment.

According to embodiments, it is possible to implement a camera device allowing a human body or the like to be inhibited from being damaged by energy of an optical signal through increased reliability.

Various and beneficial advantages and effects of the present invention are not limited to the above description and will be more easily understood in a process of describing specific embodiments of the present invention.

MODES OF THE INVENTION

Figure 1:
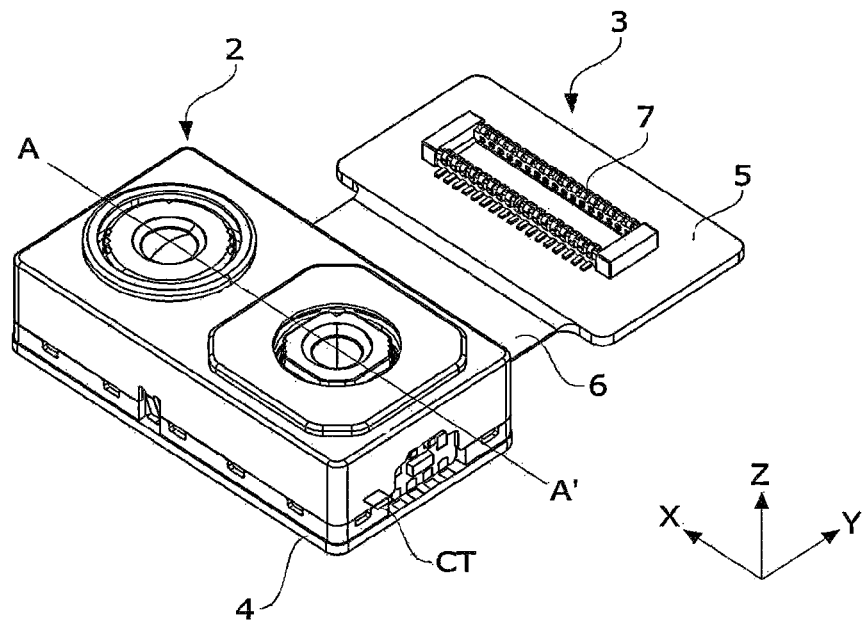
FIG. 1 is a perspective view of a camera device according to an embodiment.

Hereinafter, exemplary embodiments of the present invention will be described in detail with reference to the accompanying drawings.

However, the technical spirit of the present invention is not limited to some embodiments to be described but may be implemented in various different forms, and one or more components in the embodiments may be selectively coupled to and substituted with each other as long as the one or more components are within the scope of the technical spirit of the present invention.

In addition, terms (including technical and scientific terms) used in the embodiments of the present invention may be construed as the meaning that can be generally understood by those skilled in the art to which the present invention pertains unless explicitly specifically defined and described, and the meaning of commonly used terms, such as terms defined in a dictionary, may be construed in consideration of contextual meanings of related technologies.

In addition, the terms used in the embodiments of the present invention are to describe the embodiments and are not intended to limit the present invention.

In the specification, the singular form may also include the plural form unless otherwise specified in the phrase, and when described as "at least one (or one or more) of A, B, and C," this may include one or more of all possible combinations of A, B, and C.

In addition, terms, such as first, second, A, B, (a), and (b), may be used to describe the components of the embodiments of the present invention.

These terms are only used to distinguish the component from another component, and the nature, order, sequence, etc. of the corresponding component are not limited by the terms.

In addition, when a certain component is described as being "connected," "coupled," or "joined" to another component, the certain component may include not only a case of being directly connected, coupled, or connected to another component, but also a case of being "connected," "coupled," or "joined" with other components interposed between the certain component and another component.

In addition, when a certain component is described as being formed or disposed on "top (above) or bottom (below)" of each component, the top (above) or bottom (below) includes not only a case in which two components are in direct contact with each other but also a case in which one or more other components are formed or disposed between the two components. In addition, when expressed as "top (above) or bottom (below)," this may also include the meaning of not only an upward direction but also a downward direction with respect to one component.

Hereinafter, an optical device according to the embodiment will be described.

The optical device may include any one of a mobile phone, a portable phone, a smart phone, a portable smart device, a digital camera, a laptop computer, a digital broadcasting terminal, a personal digital assistant (PDA), a portable multimedia player (PMP), and a navigation device. However, the type of the optical device is not limited thereto, and any device for capturing images or photos may be included in the optical device.

The optical device may include a body. The body may have a bar shape. Alternatively, the body may have any of various structures, such as a slide type, a folder type, a swing type, and a swivel type in which two or more sub-bodies are coupled to be relatively movable. The body may include a case (a casing, a housing, or a cover) constituting an exterior. For example, the body may include a front case and a rear case. Various electronic components of the optical device may be embedded in a space formed between the front case and the rear case.

The optical device may include a display. The display may be disposed on one surface of the body of the optical device. The display may output an image. The display may output an image captured by the camera.

The optical device may include a camera. The camera may include a time of flight (TOF) camera device. The TOF camera device may be disposed on a front surface of the body of the optical device. In this case, the TOF camera device may be used for various types of biometric recognition, such as user's face recognition and iris recognition for security authentication of the optical device.

Hereinafter, a configuration of a TOF or distance measuring camera device according to embodiments will be described with reference to the accompanying drawings.

Figure 2:
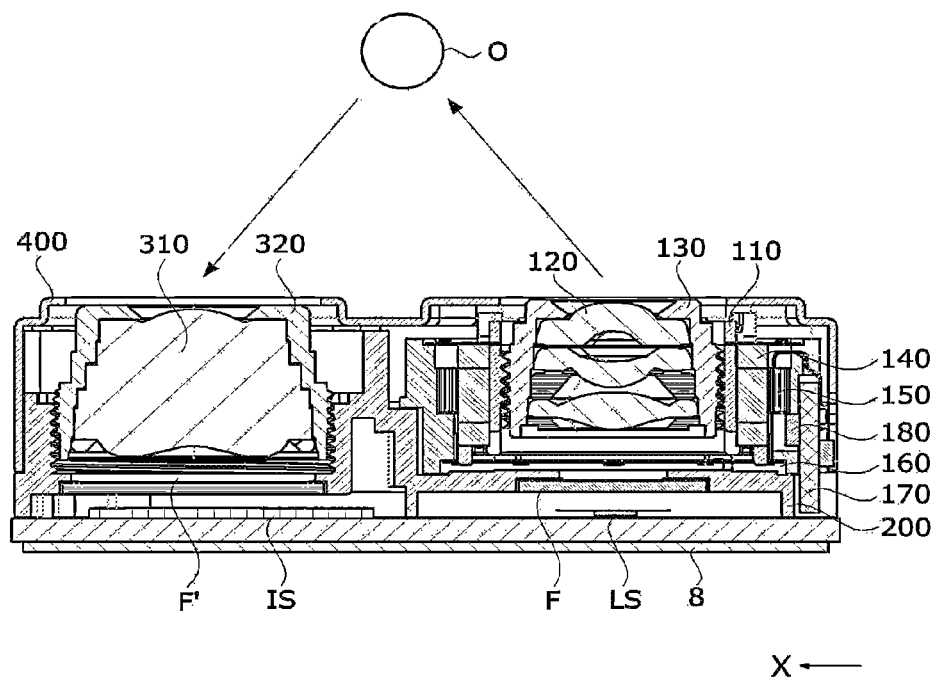
FIG. 2 is a cross-sectional view along line A-A' in FIG. 1.
Figure 3:
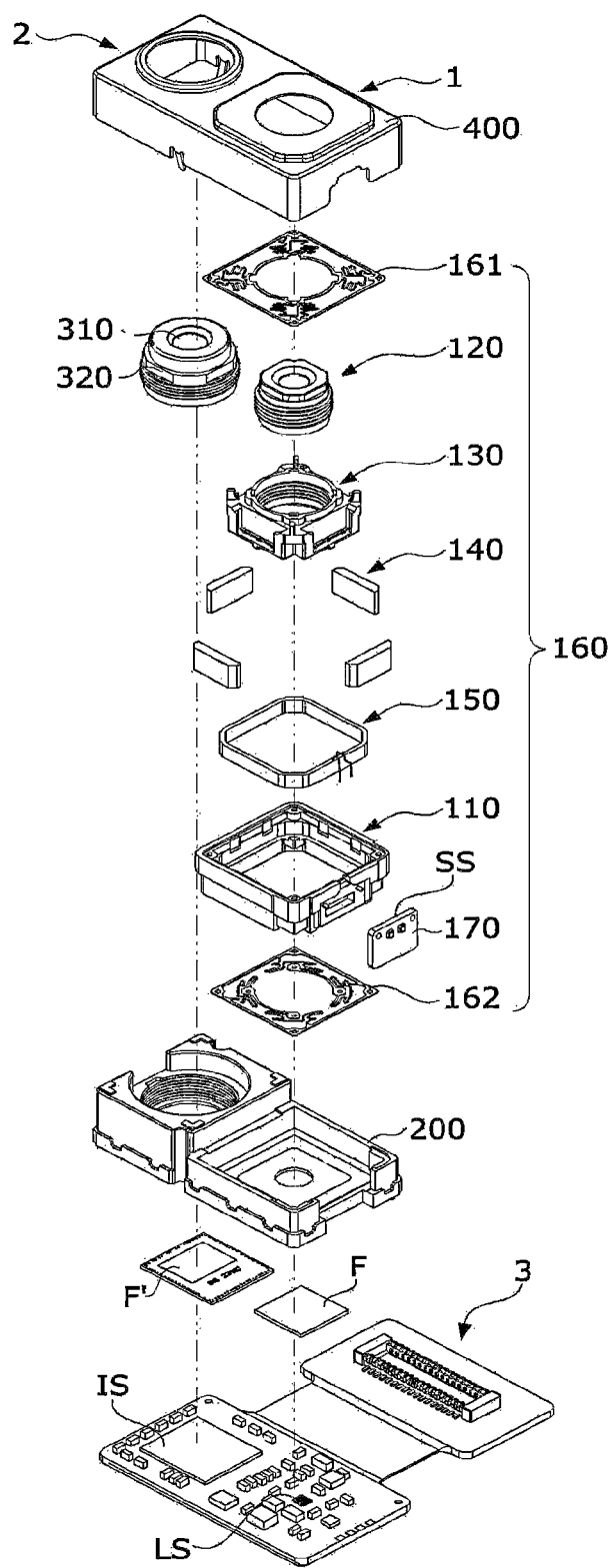
FIG. 3 is an exploded perspective view of the camera device according to the embodiment.

FIG. 1 is a perspective view of a camera device according to an embodiment, FIG. 2 is a cross-sectional view along line A-A' in FIG. 1, and FIG. 3 is an exploded perspective view of the camera device according to the embodiment.

Referring to FIGS. 1 to 3, a camera device 10 according to the embodiment may include a light emitting unit 1, a light receiving unit 2, a connection unit 3, a main substrate 4, an extension substrate 5, a connecting substrate 6, and a connector 7. In addition, the camera device 10 according to the embodiment may include a controller CT. The controller CT may be positioned on any one of the light emitting unit 1, the light receiving unit 2, the connection unit 3, and the main substrate 4. In addition, in the specification, the camera device may be a concept having only any one of the light emitting unit 1 and the light receiving unit 2. Alternatively, the camera device may be a concept including a substrate (e.g., the main substrate 4) electrically connected to any one of the light emitting unit 1 and the light receiving unit 2.

First, the light emitting unit 1 may be a light emitting module, a light emitting unit, a light emitting assembly, or a light emitting device. The light emitting unit 1 may generate light or an optical signal and then radiate the light or the optical signal to an object. Hereinafter, the light and the optical signal are used interchangeably. In this case, the light emitting unit 1 may generate and output the optical signal in the form of a pulse wave or in the form of a continuous wave. The continuous wave may be in the form of a sinusoid wave or a squared wave.

In addition, by generating the optical signal in the form of the pulse wave or the continuous wave, for example, the TOF camera device may detect a phase difference between an optical signal output from the light emitting unit 1 and input light input to the light receiving unit 2 of the TOF camera device after the optical signal is reflected from an object O. In the specification, the output light may refer to an optical signal output from the light emitting unit 1 and incident on the object O, and the input light or reflected light may refer to an optical signal output from the light emitting unit 1 to reach the object O, reflected from the object O, and then input to the TOF camera device. In addition, from the viewpoint of the object O, the output light may be incident light, and the input light may be reflected light.

The light emitting unit 1 radiates the generated optical signal to the object O for a predetermined integration time. Here, the integration time refers to one frame period. When a plurality of frames are generated, the set integration time is repeated. For example, when the TOF camera device captures an object at 20 frames per second (FPS), the integration time becomes 1/20 [sec]. In addition, when 100 frames are generated, the integration time may be repeated 100 times. Therefore, the light source may also emit light in a frame period.

In addition, the light emitting unit 1 may generate a plurality of optical signals having different frequencies. The light emitting unit 1 may sequentially and repeatedly generate the plurality of optical signals having different frequencies. Alternatively, the light emitting unit 1 may also generate the plurality of optical signals having different frequencies at the same time.

The light emitting unit 1 may include a light source LS. The light source LS may generate light. The light source LS may output light. The light source LS may radiate light. The light generated by the light source LS may be infrared rays having a wavelength in a range of 770 nm to 3000 nm. Alternatively, the light generated by the light source LS may be visible rays having a wavelength in a range of 380 nm to 770 nm. The light source LS may include various elements for generating and outputting light. For example, the light source LS may include a light emitting diode (LED) or vertical cavity surface emitting laser (VCSEL). For example, when the light source LS is the VCSEL, a plurality of emitters may be formed in the form of being arranged horizontally or vertically on a plane perpendicular to an optical axis. Furthermore, when light is output in a point shape, the point shape may correspond to a shape in which the emitters are arranged. For example, when the emitter is 3×3 (width×height), the light having the point shape may also be 3×3.

In addition, the light source LS may include a plurality of LEDs arranged in a regular pattern. In addition, the light source LS may include an organic LED (OLED) or a laser diode (LD).

The light emitting unit 1 may include a light modulator for modulating light. The light source LS may generate the optical signal in the form of the pulse wave or the continuous wave by repeating blinking (ON/OFF) at a predetermined time interval. The predetermined time interval may be a frequency of the optical signal. The blinking of the light source LS may be controlled by the light modulator. The light modulator may control the blinking of the light source LS so that the light source LS generates the optical signal in the form of the continuous wave or the pulse wave. The light modulator may control the light source LS to generate the optical signal in the form of the continuous wave or the pulse wave through frequency modulation, pulse modulation, etc. The light modulator may be positioned in the controller. Therefore, as will be described below, it should be understood that the controller may block (OFF or turn off) the output of the optical signal by the light source or provide (ON) the optical signal by controlling the light modulator.

The light emitting unit 1 may include a diffuser (not shown). The diffuser (not shown) may be a diffuser lens. The diffuser (not shown) may be disposed in front of the light source LS. The light emitted from the light source LS may pass through the diffuser (not shown) and may be incident on the object O. The diffuser (not shown) may change a path of the light emitted from the light source LS. The diffuser (not shown) may diffuse the light emitted from the light source LS. The diffuser (not shown) may also be positioned in a first optical part to be described below.

Specifically, the light emitting unit 1 may include the above-described light source LS, a housing 110, a first optical part 120, a first lens barrel 130, a driving unit including a driving magnet part 140 and a driving coil part 150, an elastic part 160, a side substrate 170, and a control element SS.

First, the housing 110 may be positioned inside a cover 400 to be described below. The housing 110 may be coupled to the first lens barrel 130, the side substrate 170, the driving coil part 150, and the elastic part 160, which will be described below.

The housing 110 may include an open barrel accommodating part therein. The first lens barrel 130 and the driving coil part 150 may be positioned in the barrel accommodating part.

The first optical part 120 may be positioned in the housing 110. The first optical part 120 may be held by the first lens barrel 130 to be described below and coupled to the housing 110 through the first lens barrel 130. In addition, the first lens barrel 130 may move in an optical axis direction in the housing 110 or from a base 200. The first optical part 120 may also move in the optical axis direction together with the first lens barrel 130. A specific description will be made below.

The first optical part 120 may be formed of a plurality of optical elements or lenses. For example, the first optical part 120 may be formed of a plurality of lenses.

In addition, the first optical part 120 may include a collimator lens. For example, the collimator lens may be formed of a plurality of lenses and may have an angle of view (FOI) of 60 degrees to 120 degrees. The collimator lens may reduce a divergence angle of light output from a light source. When a laser divergence angle of each aperture of the VCESL that is a light source is 20 degrees to 25 degrees, a divergence angle of light passing through the collimator lens may be 1 degree or less.

In addition, the first optical part 120 may copy the optical signal output from the light source LS according to a preset copying pattern. Therefore, the first optical part 120 may include a diffractive optical element (DOE) or a diffuser lens. For example, the first optical part 120 may include an optical member having a micro-scale or nano-scale structure.

The optical signal (output light) emitted from the light source LS toward the object may pass through the first lens barrel 130. An optical axis of the first lens barrel 130 and an optical axis of the light source LS may be aligned. In addition, the first lens barrel 130 may be coupled to the housing 110. In addition, the first lens barrel 130 may be fixed to the housing 110. The first lens barrel 130 may hold the first optical part 120 formed of a plurality of optical elements.

The first lens barrel 130 may include a lens accommodating portion 131 in which the first optical part 120 is seated. As will be described below, the first lens barrel 130 may move up or down by a voice coil motor or the like. In other words, the first lens barrel 130 may move up or down in the optical axis direction by an actuator such as a voice coil motor. Therefore, as will be described below, the light generated from the light source may be changed into a planar shape or a point shape while passing through the first lens barrel 130. In addition, the first lens barrel 130 may include a magnet seating groove 132 in which the driving magnet part is seated.

In addition, a screw thread structure may be formed on a side surface of the lens accommodating portion 131 to be coupled to the first optical part 120. Therefore, the first optical part 120 may move up or down in the housing 110 together with the first lens barrel 130 by the driving unit to be described below.

In addition, the side substrate 170 may be coupled to the housing 110. The side substrate 170 may be positioned in a substrate groove 112 located in a side surface of the housing 110. In addition, the side substrate 170 may be electrically connected to the main substrate 4.

In addition, the driving unit may include the driving magnet part 140 and the driving coil part 150.

The driving magnet part 140 may include a plurality of magnets. The plurality of magnets may be positioned in the magnet seating groove 132 located in a side surface of the first lens barrel 130.

The driving magnet part 140 may move the first lens barrel 130 and the first optical part 120 up or down with respect to the housing 110 by electromagnetic interaction with the driving coil part 150 to be described below. Therefore, separation distances from the lower light source LS to the first optical part 120 and the first lens barrel 130 may increase or decrease. In addition, the output light may have a shape of the light source having a planar shape (or a planar light source) or a point shape (or a point light source or a point pattern) with respect to the object according to the above-described separation distances.

The driving coil part 150 may include a plurality of coils and may be positioned on the side surface of the housing 110. In addition, the driving coil part 150 may be positioned inside the housing 110. The driving coil part 150 may be positioned to face the driving magnet part 140. For example, at least a portion of the driving coil part 150 may be positioned to face the driving magnet part 140. Therefore, when a current flows into the driving coil part 150, the first lens barrel 130 may be moved by electromagnetic interaction (e.g., a Lorentz force) between the driving coil part 150 and the driving magnet part 140.

The driving coil part 150 may be positioned on each coil seating portion 114 formed on the side surface of the housing 110. The driving coil part 150 may be electrically connected to the side substrate 170. For example, the driving coil part 150 may be electrically connected to the side substrate 170 by a wire or the like. In addition, since the side substrate 170 is coupled to the housing 110 as described above, the driving coil part 150 may also be seated in the coil seating portion 114 formed on the side surface of the housing 110 and coupled to the housing. A specific description thereof will be made below.

The elastic part 160 may be disposed on the housing 110. The elastic part 160 may be coupled to the first lens barrel 130 and the housing 110. The housing 110 may be fixedly coupled to the main substrate 4 or the base 200 to be described below. Unlike this, the first lens barrel 130 may move up or down with respect to the housing 110 by the above-described Lorentz force. The elastic part 160 may provide a preload for vertical movement of the first lens barrel 130 or the first optical part 120. Therefore, when the Lorentz force is not generated by the driving unit, the first lens barrel 130 may maintain a predetermined position with respect to the housing 110. In addition, since the positional relationship between the first lens barrel 130 and the housing 110 is maintained within a predetermined range even when the Lorentz force is generated by the driving unit, it is possible to increase the reliability of the camera device.

The control element SS may be electrically connected to the side substrate 170. In addition, the control element SS may be positioned on the side substrate 170. In addition, the control element SS may be disposed to be spaced a predetermined distance from the driving magnet part 140.

The control element SS may include a Hall sensor or a Hall integrated circuit (IC). The control element SS may detect a magnetic force of the driving magnet part 140.

The control element SS according to the embodiment may detect a magnitude of the magnetic field generated by the driving magnet part and output positional information on the first lens barrel 130 or the light source LS of the first optical part 120. Therefore, the controller may determine a defect of the first optical part 120 or the first lens barrel 130 on the basis of the positional information on the control element SS and control the output (ON/OFF) of the light source LS in response to a result of the determination.

In an embodiment, the control element SS may include a plurality of control elements. The control element SS may include two sensors. The control element SS may detect the movement of the first lens barrel 130 and the first optical part 120 in the optical axis direction. In the specification, a Z-axis direction is the optical axis direction or a vertical direction as a third direction. In addition, an X-axis direction is a direction perpendicular to the Z-axis direction and is a first direction as a direction from the light emitting unit toward the light receiving unit in the embodiment. In addition, a Y-axis direction is a direction perpendicular to the X-axis direction and the Z-axis direction and is a second direction. The following description will be made on the basis of the above content.

The light receiving unit 2 may be a light receiving module, a light receiving unit, a light receiving assembly, or a light receiving device, and may be one component of the camera device. The light receiving unit 2 may receive the light (reflected light) emitted from the light emitting unit 1 and reflected from the object, and convert the received light into an electrical signal.

The light receiving unit 2 may generate input light corresponding to the optical signal output from the light emitting unit 1. The light receiving unit 2 may be disposed parallel with the light emitting unit 1. The light receiving unit 2 may be disposed beside the light emitting unit 1. The light receiving unit 2 may be disposed in the same direction as the light emitting unit 1. With this configuration, it is possible to increase reception efficiency of the input light in the light receiving unit 2.

The light receiving unit 2 may receive the reflected light during the integration time and generate an electrical signal thereof. In an embodiment, the camera device may perform direct distance measurement or indirect distance measurement through the light receiving unit 2. The light receiving unit 2 may also have a structure separated from the light emitting unit 1.

First, in the case of the direct distance measurement, the camera device may measure a distance to an object through a time difference between a reception time point of the reflected light and an output time point of the output light.

In addition, in the case of the indirect distance measurement, the camera device may measure a distance to the object through synthesis between a reference signal synchronized with the output light and having a different phase and the reflected light.

The direct distance measurement is easy to measure long distances compared to the indirect distance measurement, has a relatively faster measuring speed due to a switching speed in nanoseconds, and is strong against multiple echoes. In contrast, the indirect distance measurement has a slower switching speed than the direct distance measurement but has the advantages that it is easy to measure short distances, is applicable to a large number of pixels, and has low data volume for distance measurement.

The camera device according to the embodiment may perform the above-described direct-TOF (or corresponding to the direct distance measurement) or indirect-TOF (or corresponding to the indirect distance measurement). In other words, the camera device 10 may be a camera device capable of measuring a distance.

The light receiving unit 2 may include a second lens barrel 320, a second optical part 310, and an image sensor IS.

The second lens barrel 320 may be coupled to the base 200 to be described below. The second lens barrel 320 may be coupled to the base to be described below by screw-coupling or the like. Therefore, the second lens barrel 320 may include a screw thread positioned on a side surface thereof. The second lens barrel 320 may also be integrally formed with the second optical part 310. However, the second lens barrel 320 is not limited thereto.

The second optical part 310 may be coupled to the second lens barrel 320. The second optical part 310 may be coupled to the base 200 through the second lens barrel 320. The second optical part 310 may be coupled to the second lens barrel 320 through various coupling methods. The second optical part 310 may be coupled to the second lens barrel 320 through screw-coupling as described above.

The second optical part 310 may include a plurality of lenses. In addition, the second optical part 310 may be aligned with the lower image sensor IS. Therefore, the reflected light passing through the second optical part 310 may be provided to the image sensor IS.

The image sensor IS may detect reflected light. The image sensor IS may detect the reflected light and output the reflected light as an electrical signal. In an embodiment, the image sensor IS may detect light having a wavelength corresponding to the wavelength of the light output from the light source LS. For example, the image sensor IS may detect infrared rays. Alternatively, the image sensor IS may detect visible rays. The image sensor IS may include any of various image sensors for sensing light.

In an embodiment, the image sensor IS may include a pixel array for receiving light passing through the second lens barrel 320 and the second optical part 310 and converting the light into an electrical signal corresponding to the light, a driving circuit for driving a plurality of pixels included in the pixel array, and a read-out circuit for reading an analog pixel signal of each pixel. The read-out circuit may compare the analog pixel signal with a reference signal and generate a digital pixel signal (or an image signal) through analog-to-digital conversion. Here, the digital pixel signal of each pixel included in the pixel array may constitute the image signal, and the image signal may be defined as an image frame as the image signal is transmitted in units of frames. In other words, the image sensor may output a plurality of image frames.

Furthermore, the light receiving unit 2 may further include an image synthesizer. The image synthesizer may include an image processor for receiving an image signal from the image sensor IS and processing the image signal (e.g., interpolation, frame synthesis, etc.). In particular, the image synthesizer may synthesize image signals (low resolution) of the plurality of frames into an image signal (high resolution) of one frame. In other words, the image synthesizer may synthesize a plurality of image frames included in the image signal received from the image sensor IS and generate a synthesized result as a synthesized image. The synthesized image generated by the image synthesizer may have a higher resolution than the plurality of image frames output from the image sensor IS. In other words, the image synthesizer may generate a high-resolution image through a super resolution (SR) technique. The plurality of image frames may include image frames generated by being changed to different optical paths by movement of filters F and F'. The image synthesizer may be positioned inside or outside the light receiving unit 2.

The filters F and F' may be coupled to the base 200. The filters F and F' may be disposed between the first lens barrel 130 and the light source LS or between the second lens barrel 320 and the image sensor IS. Therefore, the filters F and F' may be disposed on an optical path between the object and the image sensor IS or an optical path between the object and the light source LS. The filters F and F' may filter light having a predetermined wavelength range.

The filters F and F' may pass light having a specific wavelength. In other words, the filters F and F' may reflect or absorb light having wavelengths other than the specific wavelength and block the light. For example, the filters F and F' may pass infrared rays and block light having wavelengths other than the infrared rays. Alternatively, the filters F and F' may pass visible rays and block light having wavelengths other than the visible rays. The filters F and F' may be infrared bandpass filters. Therefore, the filters F and F' may pass only infrared rays. Alternatively, the optical member may be a separate fixed focus lens or variable focus lens (e.g., a liquid lens) separated from the lens module.

In addition, the filters F and F' are movable. In an embodiment, the filters F and F' may be tilted. When the filters F and F' are tilted, the optical path may be adjusted. When the filters F and F' are tilted, a path of light incident to the image sensor IS may be changed. For example, the filter F' in the light receiving unit 2 may change a field of view (FOV) angle, a direction of the FOV, etc. of the incident light. In addition, in an embodiment, as the filters F and F' are tilted obliquely, a path along which light enters may be changed to enable high-resolution TOF.

The cover 400 may be a bracket. The cover 400 may include a "cover can." The cover 400 may be disposed to surround the light emitting unit 1 and the light receiving unit 2. The cover 400 may be coupled to the housing 110 and the base 200. The cover 400 may accommodate the light emitting unit 1 and the light receiving unit 2. Therefore, the cover 400 may be positioned on an outermost side of the camera device.

In addition, the cover 400 may be made of a non-magnetic material. In addition, the cover 400 may be made of a metal. In addition, the cover 400 may be formed of a metal plate.

The cover 400 may be connected to a ground portion of the main substrate 4. Therefore, the cover 400 may be grounded. In addition, the cover 400 may block electromagnetic interference (EMI). At this time, the cover 400 may be referred to as an "EMI shield can." The cover 400 is a component that is assembled last and can protect a product from an external impact. The cover 400 may be made of a material having a thin thickness and a high strength.

In addition, in the camera device 10 according to the embodiment, the light emitting unit 1 and the light receiving unit 2 may be disposed on the main substrate (printed circuit board (PCB)) 4. The main substrate 4 may be electrically connected to the light emitting unit 1 and the light receiving unit 2.

In addition, the connection unit 3 in the camera device 10 may be electrically connected to the main substrate 4. The connection unit 3 may be connected to the configuration of the optical device. The connection unit 3 may include the connector 7 connected to the configuration of the optical device. The connection unit 3 may include the extension substrate 5 on which the connector 7 is disposed and connected to the connecting substrate 6. The extension substrate 5 may be a PCB, but is not limited thereto.

In addition, the connecting substrate 6 in the camera device may connect the main substrate 4 and the extension substrate 5 of the connection unit 3. The connecting substrate 6 may have flexibility. The connecting substrate 6 may be a flexible PCB (FPCB).

In addition, the main substrate 4, the connecting substrate 6, and the extension substrate 5 may be formed integrally or separately.

In addition, the light emitting unit 1 and the light receiving unit 2 described above may be positioned on the main substrate 4, and the light emitting unit 1 and the light receiving unit 2 may be electrically connected to the main substrate 4.

The camera device may include a reinforcing plate 8. The reinforcing plate 8 may include a stiffener. The reinforcing plate 8 may be disposed on a lower surface of the main substrate 4. The reinforcing plate 8 may be made of stainless steel.

Furthermore, the light receiving unit 2 may include a lens driving device. In other words, the light receiving unit 2 may include a voice coil motor (VCM). In addition, the light receiving unit 2 may include a lens driving motor. In addition, the light receiving unit 2 may include a lens driving actuator. With this configuration, as described above, the light receiving unit 2 according to the embodiment may tilt the filter F'. In addition, as the filter F' is tilted, the optical path of the input light passing through the filters F and F' may repeatedly move according to a predetermined rule.

Therefore, the light receiving unit 2 may output high-resolution image information using a plurality of image information converted by the image sensor according to the tilt of the filter F', and the output image information may be provided to an external optical device.

Figure 4:
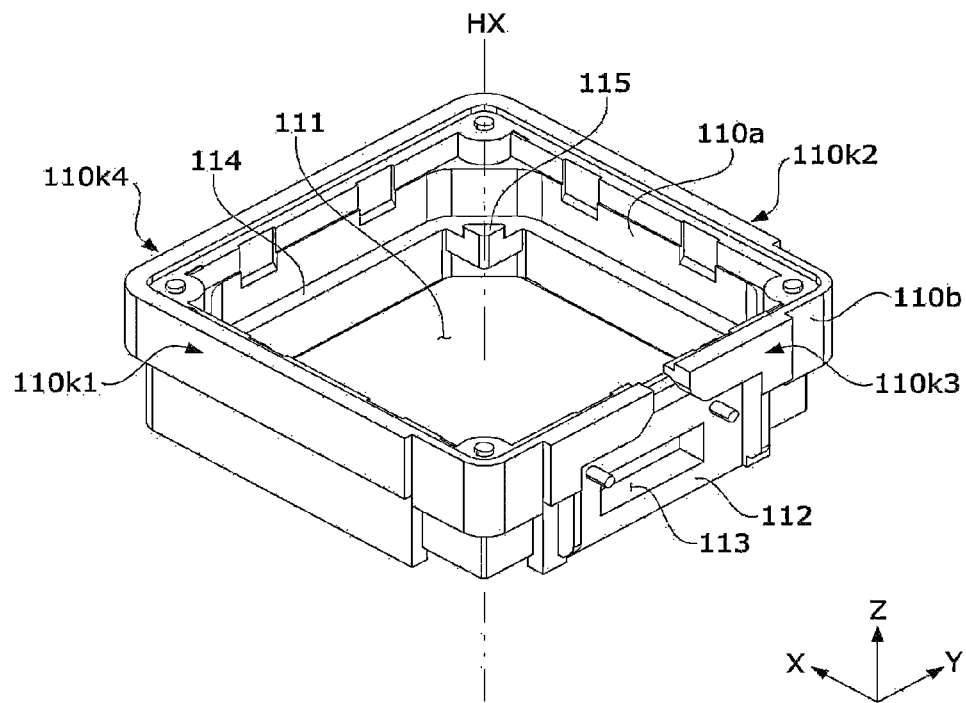
FIG. 4 is a perspective view showing a housing of a light emitting unit according to the embodiment.
Figure 5:
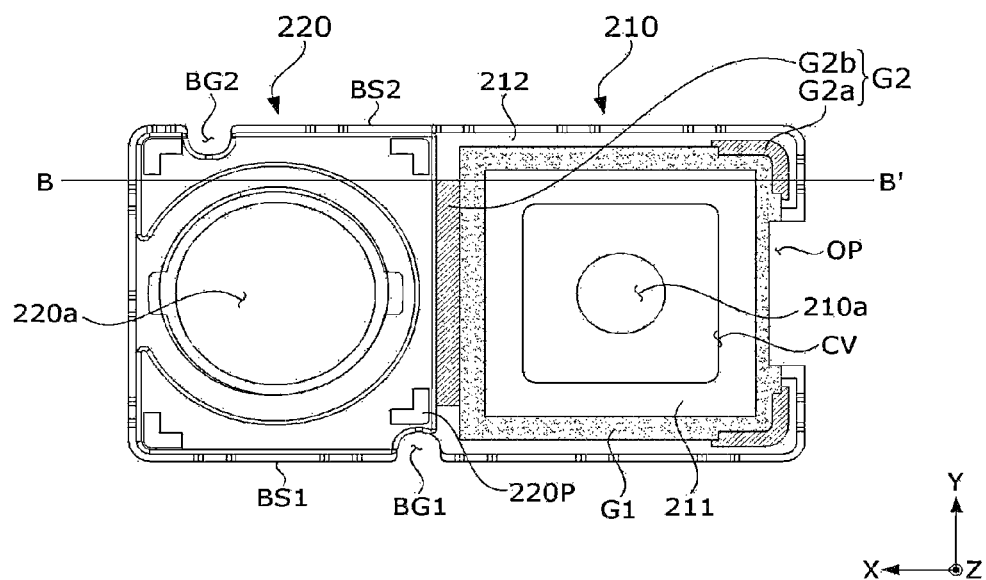
FIG. 5 is a top view of the housing of the light emitting unit according to the embodiment.
Figure 6:
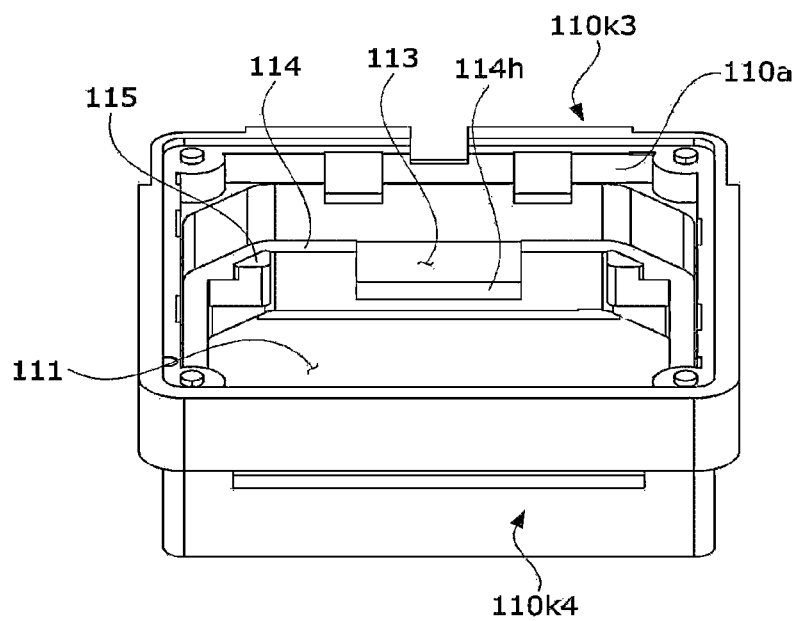
FIG. 6 is another perspective view of the housing of the light emitting unit according to the embodiment.

FIG. 4 is a perspective view showing a housing of a light emitting unit according to the embodiment, FIG. 5 is a top view of the housing of the light emitting unit according to the embodiment, and FIG. 6 is another perspective view of the housing of the light emitting unit according to the embodiment.

Referring to FIGS. 4 to 6, the housing 110 of the light emitting unit according to the embodiment may include a housing hole 111, the substrate groove 112, a hole 113, the coil seating portion 114, and a seating protrusion 115.

The housing hole 111 may be positioned at the center of the housing 110. The first optical part, the first lens barrel, and the driving unit may be seated in the housing hole 111.

In an embodiment, the housing 110 may include a housing side portion 110$k$1, a second housing side portion 110$k$2, a third housing side portion 110$k$3, and a fourth housing side portion 110$k$4. The housing side portion 110$k$1 to the fourth housing side portion 110$k$4 refer to portions positioned on each side portion of the housing 110. The housing side portion 110$k$1 is used interchangeably with a first housing side portion.

Specifically, the housing side portion 110$k$1 and the second housing side portion 110$k$2 may be disposed to face each other. In addition, the housing side portion 110$k$1 and the second housing side portion 110$k$2 may be disposed to be spaced apart from each other in the second direction (Y-axis direction). In other words, the housing side portion 110$k$1 and the second housing side portion 110$k$2 may be symmetrically disposed to each other in the first direction (X-axis direction) or the third direction (Z-axis direction).

The third housing side portion 110$k$3 and the fourth housing side portion 110$k$4 may be disposed to face each other. In addition, the third housing side portion 110$k$3 and the fourth housing side portion 110$k$4 may be positioned between the housing side portion 110$k$1 and the second housing side portion 110$k$2. In addition, the third housing side portion 110$k$3 and the fourth housing side portion 110$k$4 may be disposed to be spaced apart from each other in the first direction (X-axis direction). In other words, the third housing side portion 110$k$3 and the fourth housing side portion 110$k$4 may be symmetrically disposed to each other in the second direction (Y-axis direction) or the third direction (Z-axis direction).

In an embodiment, the substrate groove 112 may be located in a side portion of the housing 110 having a maximum separation distance from the light receiving unit. Therefore, the substrate groove 112 may be located in the third housing side portion 110$k$4 of the housing 110. With this configuration, it is possible to minimize influence of electromagnetic waves generated by an electrical signal or the like in the light receiving unit on the driving of the light emitting unit.

In an embodiment, the housing 110 may have a quadrangular shape on an XY plane. However, the housing 110 is not limited thereto and may be formed in any of various shapes.

In addition, a coupling protrusion to be coupled with the side substrate may be positioned in the substrate groove 112. The coupling protrusion may extend outward from an outer surface of the third housing side portion 110$k$3 of the housing 110. In addition, a coupling hole may be provided in the side substrate, and the coupling protrusion may be inserted into the coupling hole so that the side substrate and the housing 110 may be coupled to each other.

The hole 113 may overlap the substrate groove 112 in the first direction (X-axis direction) and the second direction (Y-axis direction).

In an embodiment, the hole 113 may pass through an outer surface 110*b* and an inner surface 110*a* of the housing. Therefore, the hole 113 may be located in the third housing side portion 110*k*3. The hole 113 may be located under the coil seating portion 114 to be described below. Therefore, even when the control element is seated in the hole 113, the control element may not overlap the driving coil part in the first direction (X-axis direction) or the second direction (Y-axis direction). In addition, the control element may be disposed to face the magnet in the hole 113 and easily electrically connected to the side substrate. In addition, the position of the control element coupled to the housing 110 may be fixed, and thus the position of the driving magnet part may be accurately measured.

The coil seating portion 114 may be positioned on the inner surface 110*a* of the housing 110. In an embodiment, the coil seating portion 114 may extend inward from the inner surface 110*a* of the housing 110. Therefore, a maximum separation distance at which inner surfaces 110*a* of the housing 110 face may be greater than a maximum separation distance at which coil seating portions 114 faces each other. In the specification, the term "inner side" may be a direction toward a central axis HX of the housing hole 111. Alternatively, the term "inner side" may be a direction from the housing toward the first optical part. In addition, the term "outer side" may be a direction opposite to the term "inner side" and may be a direction from the first optical part toward the housing. The central axis HX of the housing hole 111 may be an axis that passes an intersection of bisectors bisecting the housing 110 in the first direction (X-axis direction) and the second direction (Y-axis direction) and is parallel to the third direction (Z-axis direction).

In addition, at least one groove IH may be located in the inner surface 110*a* of the housing 110. An adhesive member, such as epoxy, may be applied to the at least one groove IH. Therefore, the coil on the coil seating portion 114 and the housing 110 may be coupled.

In addition, an upper surface of the coil seating portion 114 may be flat. Therefore, the driving coil part may be easily seated, and the first lens barrel may accurately move up or down according to the electromagnetic interaction between the driving coil part and the driving magnet.

In addition, the coil seating portion 114 may include a seating groove 114*h* that is convex downward (or concave upward) from the third housing side portion 110*k*3. The seating groove 114*h* may be positioned to correspond to the hole 113 described above and may be a groove formed downward from the coil seating portion 114. The seating groove 114*h* may have a shape that is convex downward and concave upward.

The control element to be described below may be seated in the seating groove 114*h*. Therefore, the control element may overlap at least a portion of the driving coil portion in the third direction (Z-axis direction). A specific description thereof will be made below.

In addition, the driving coil part may have a closed loop shape as will be described below. Therefore, the coil seating portion 114 may also have a closed loop shape corresponding to the shape of the driving coil part.

The seating protrusion 115 may be connected to the coil seating portion 114 and located inside the coil seating portion 114. Therefore, since the seating protrusion 115 is located inside the coil seating portion 114, the seating protrusion 115 may overlap at least a portion of the first lens barrel positioned inside the coil seating portion 114. Therefore, the seating protrusion 115 may serve as a stopper for the vertical movement of the first lens barrel.

In addition, an upper surface of the seating protrusion 115 may have a stepped portion with respect to the coil seating portion 114. In other words, the upper surface of the seating protrusion 115 may be positioned above the coil seating portion 114. With this configuration, the seating protrusion 115 can inhibit the driving coil part from being separated from the coil seating portion 114.

For example, the coil seating portion 114 may be formed as a step extending inward from the inner surface of the housing 110. In the specification, the term "inner side" may be a direction from the housing to the first optical part, and the term "outer side" may be a direction opposite to the term "inner side" and may be a direction from the first optical part to the housing.

Figure 7:
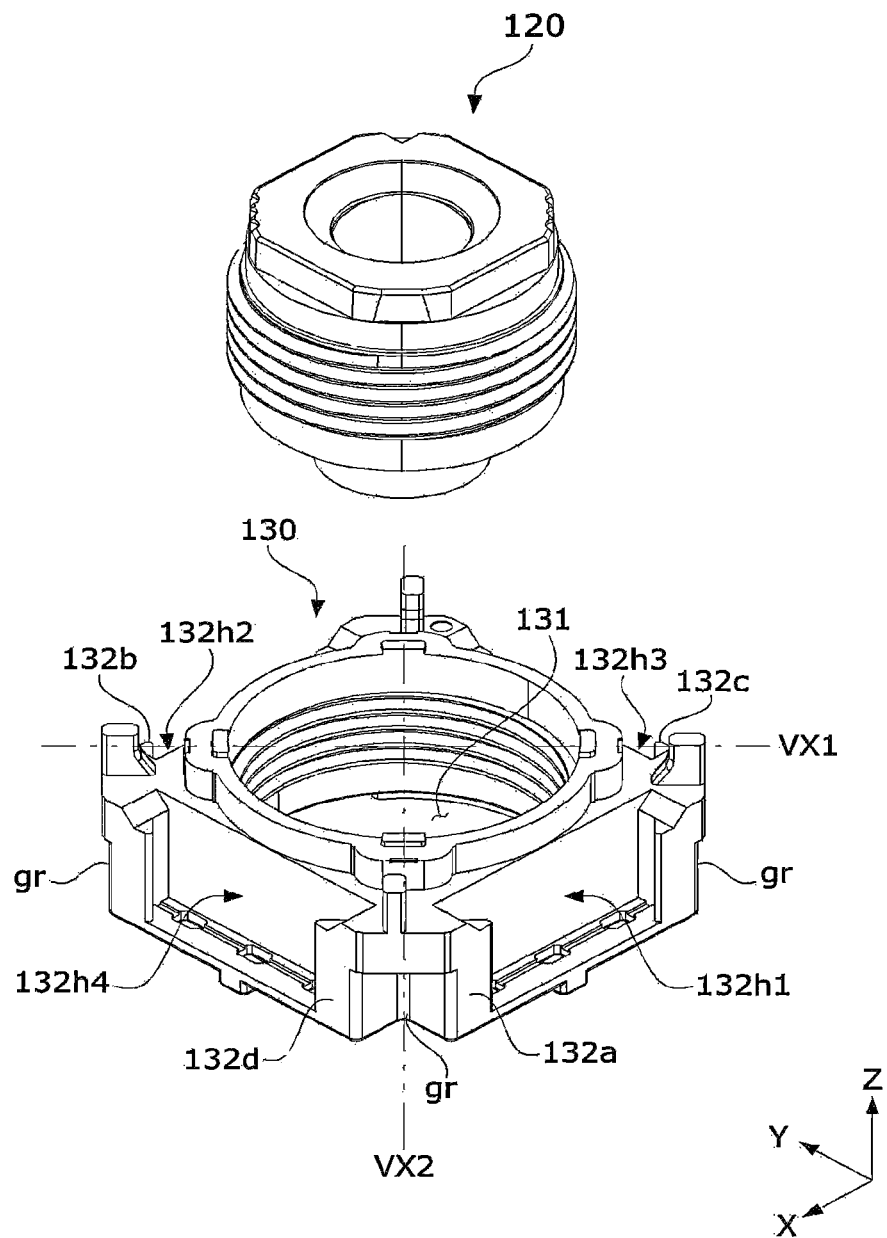
FIG. 7 is a view showing a first optical part and a first lens barrel of the light emitting unit according to the embodiment.
Figure 8:
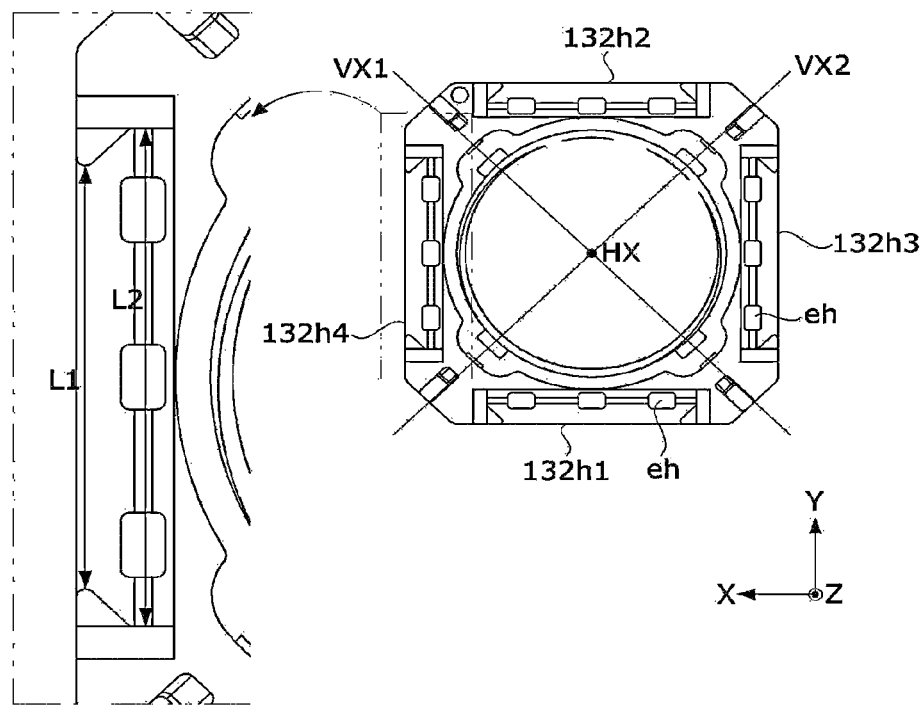
FIG. 8 is a perspective view of the first lens barrel of the light emitting unit according to the embodiment.
Figure 9:
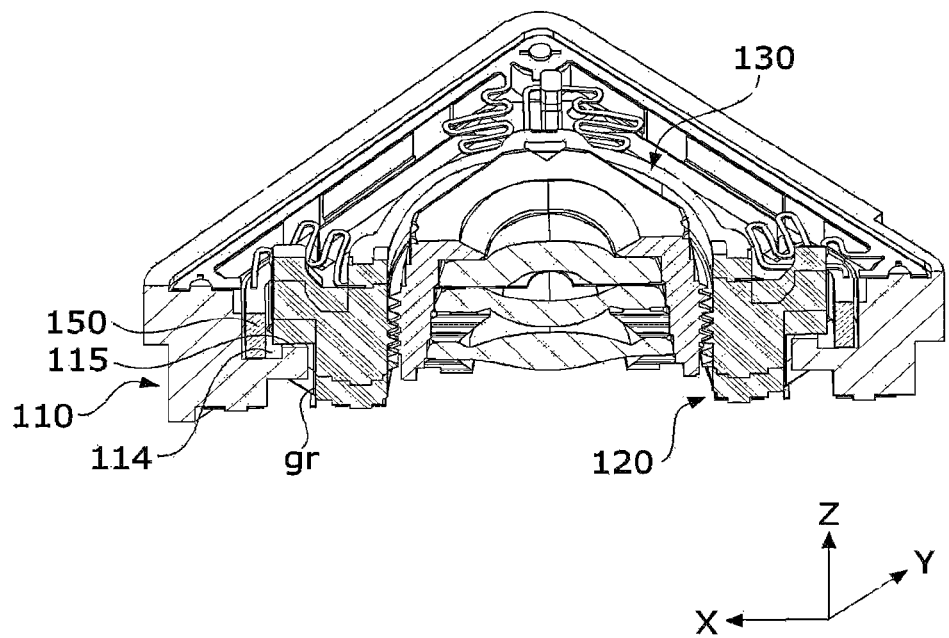
FIG. 9 is a cross-sectional view of the first lens barrel, the housing, and a driving coil part of the light emitting unit according to the embodiment.

FIG. 7 is a view showing a first optical part and a first lens barrel of the light emitting unit according to the embodiment, FIG. 8 is a perspective view of the first lens barrel of the light emitting unit according to the embodiment, and FIG. 9 is a cross-sectional view of the first lens barrel, the housing, and the driving coil part of the light emitting unit according to the embodiment.

Referring to FIGS. 7 and 8, the first optical part 120 of the light emitting unit may be inserted into the lens accommodating portion 131 of the first lens barrel 130. As described above, the first optical part 120 may be formed of the plurality of lenses. In addition, the first optical part 120 may include a screw thread positioned on an outer surface thereof. The first lens barrel 130 may also have a screw groove corresponding to the screw thread of the first optical part 120 in an inner surface thereof. Therefore, the first optical part 120 and the first lens barrel 130 may be screw-coupled.

In an embodiment, the first lens barrel 130 may include not only the lens accommodating portion 131 described above, but also magnet seating grooves 132*h*1 to 132*h*4. A plurality of magnet seating grooves 132*h*1 to 132*h*4 may be formed. In an embodiment, four magnet seating grooves may be formed and located in each outer surface of the first lens barrel 130.

In an embodiment, the first lens barrel 130 may be positioned on a first outer surface 132*a* and a second outer surface 132*b* opposite to each other, and a third outer surface 132*c* and a fourth outer surface 132*d* opposite to each other and positioned between the first outer surface 132*a* and the second outer surface 132*b*.

In addition, the first outer surface 132*a* may face the above-described housing side portion, the second outer surface 132*b* may face the above-described second housing side portion, the third outer surface 132*c* may face the above-described third housing side portion, and the fourth outer surface 132*d* may face the above-described fourth housing side portion.

In addition, the plurality of magnet seating grooves may include a first magnet seating groove 132*h*1 to a fourth magnet seating groove 132*h*4. The first magnet seating groove 132*h*1 may be located in the first outer surface 132*a*. In addition, the second magnet seating groove 132*h*2 may be located in the second outer surface 132*b*. In addition, the third magnet seating groove 132*h*3 may be located in the third outer surface 132*c*. In addition, the fourth magnet seating groove 132*h*4 may be located in the fourth outer surface 132*d*.

The magnet of the driving magnet part to be described below may be seated in each of the first magnet seating groove 132h1 to the fourth magnet seating groove 132h4.

In addition, the first magnet seating groove 132h1 and the second magnet seating groove 132h2 may be opposite to each other, and the third magnet seating groove 132h3 and the fourth magnet seating groove 132h4 may be opposite to each other. Furthermore, the first magnet seating groove 132h1 to the fourth magnet seating groove 132h4 may have the same shape. With this configuration, the electromagnetic force generated by the magnet seated in the magnet seating groove may be constantly generated upward or downward, and thus the first lens barrel may move up or down in a balanced manner without tilting to one side.

According to the embodiment, areas (on an XZ or YZ plane) of the first magnet seating groove 132h1 to the fourth magnet seating groove 132h4 may be reduced outward. In addition, the first magnet seating groove 132h1 to the fourth magnet seating groove 132h4 may have an outermost length L1 smaller than an innermost length L2. With this configuration, it is possible to suppress a phenomenon in which each of the plurality of magnets to be described below is separated from the first magnet seating groove 132h1 to the fourth magnet seating groove 132h4. In other words, it is possible to increase a coupling force between the plurality of magnets and the plurality of magnet seating grooves.

Furthermore, the first lens barrel according to the embodiment may further include injection holes eh located in lower portions of the first magnet seating groove 132h1 to the fourth magnet seating groove 132h4. The injection holes eh may be located in the lower portions of the first magnet seating groove 132h1 to the fourth magnet seating groove 132h4. For example, the injection holes eh may be located in bottom surfaces of the first magnet seating groove 132h1 to the fourth magnet seating groove 132h4. In addition, the injection holes eh may be positioned to overlap the first magnet seating groove 132h1 to the fourth magnet seating groove 132h4 in the third direction (Z-axis direction). Therefore, when the adhesive member is injected through the injection hole eh, the adhesive member may move between the magnet seating groove and the magnet. In other words, the adhesive member may be spread over the entire region between the magnets and the magnet seating grooves through an injection pressure and a capillary phenomenon. Therefore, it is possible to further increase the coupling force between the magnet and the magnet seating groove, thereby inhibiting the magnet from being separated from the magnet seating groove.

In addition, barrel grooves gr may be positioned between adjacent magnet seating grooves in the first magnet seating groove 132h1 to the fourth magnet seating groove 132h4. According to the embodiment, the barrel grooves gr may be positioned on a first virtual line VX1 and a second virtual line VX2. In addition, the barrel grooves gr may be bisected by the first virtual line VX1 and the second virtual line VX2.

In addition, in an embodiment, the first virtual line VX1 bisects the second magnet seating groove 123h2 and the fourth magnet seating groove 132h4 and bisects the first magnet seating groove 132h1 and the third magnet seating groove 132h3. In addition, the second virtual line VX2 may bisect the first magnet seating groove 132h1 and the fourth magnet seating groove 132h4 and bisect the third magnet seating groove 132h3 and the second magnet seating groove 132h2. In addition, an intersection of the first virtual line VX1 and the second virtual line VX2 may be positioned on the central axis HX of the housing hole described above.

The barrel groove gr may be located in the lower portion of the first lens barrel 130. Therefore, the first lens barrel 130 may have a structure having an open lower edge due to the barrel groove gr. Therefore, the above-described seating protrusion of the housing may be positioned in the barrel groove gr. Therefore, the first lens barrel 130 may be supported by the seating protrusion.

Referring to FIG. 9, the barrel groove gr may overlap the seating protrusion 115 of the housing 110 in the third direction (Z-axis direction). Therefore, even when the first lens barrel 130 moves in the third direction (Z-axis direction), the seating protrusion 115 of the housing 110 can block the first lens barrel 130 from moving downward. Therefore, it is possible to inhibit a collision between the above-described control element positioned in the hole and the first lens barrel even when the first lens barrel moves. Therefore, it is possible to increase the reliability of the element.

Figure 10:
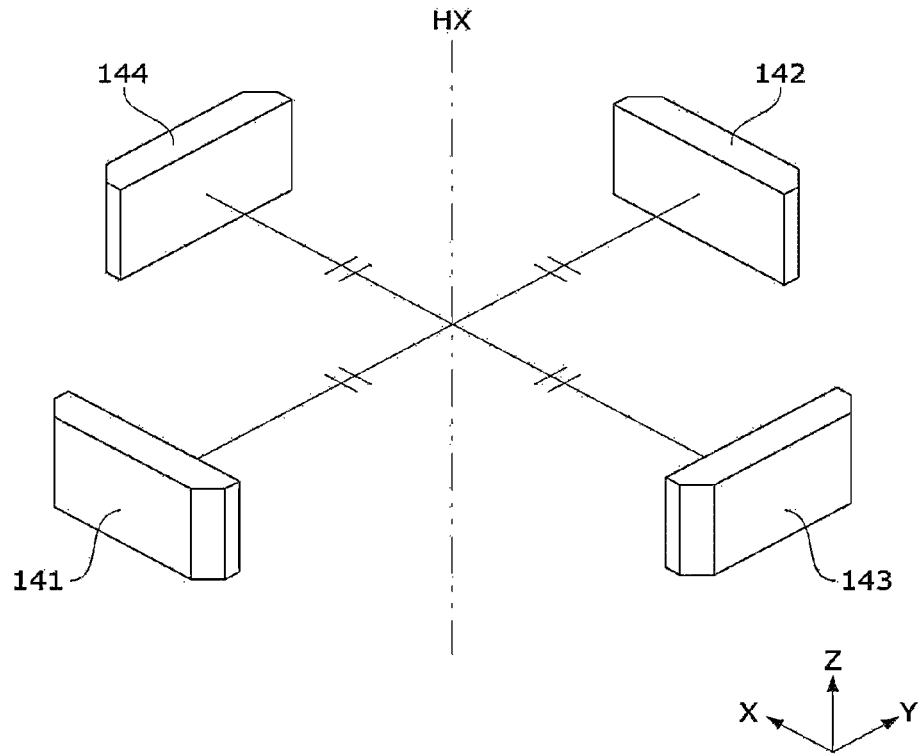
FIG. 10 is a view showing a driving magnet part and the driving coil part of the light emitting unit according to the embodiment.
Figure 11:
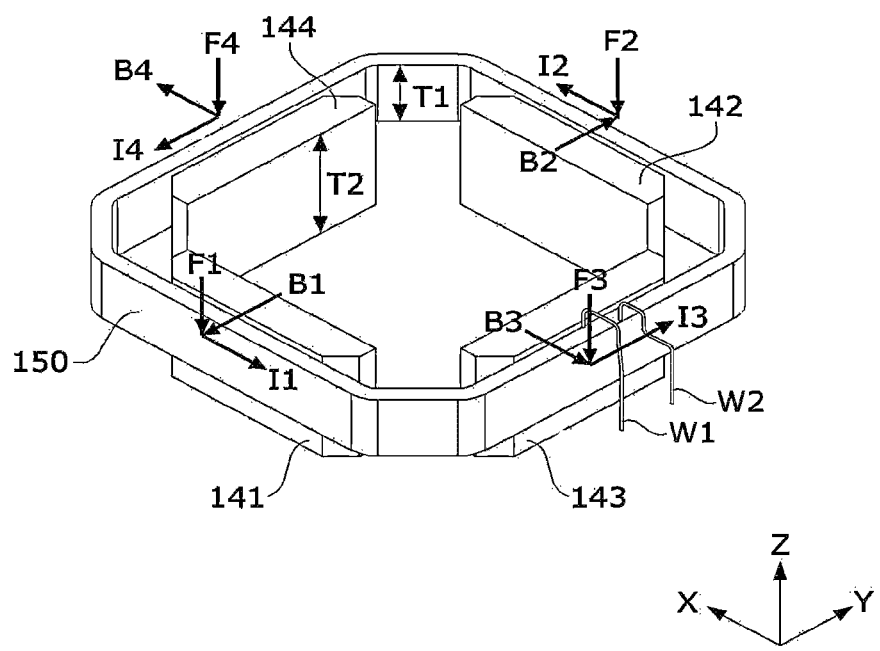
FIG. 11 is a view showing driving of the driving magnet part and the driving coil part of the light emitting unit according to the embodiment.
Figure 12:
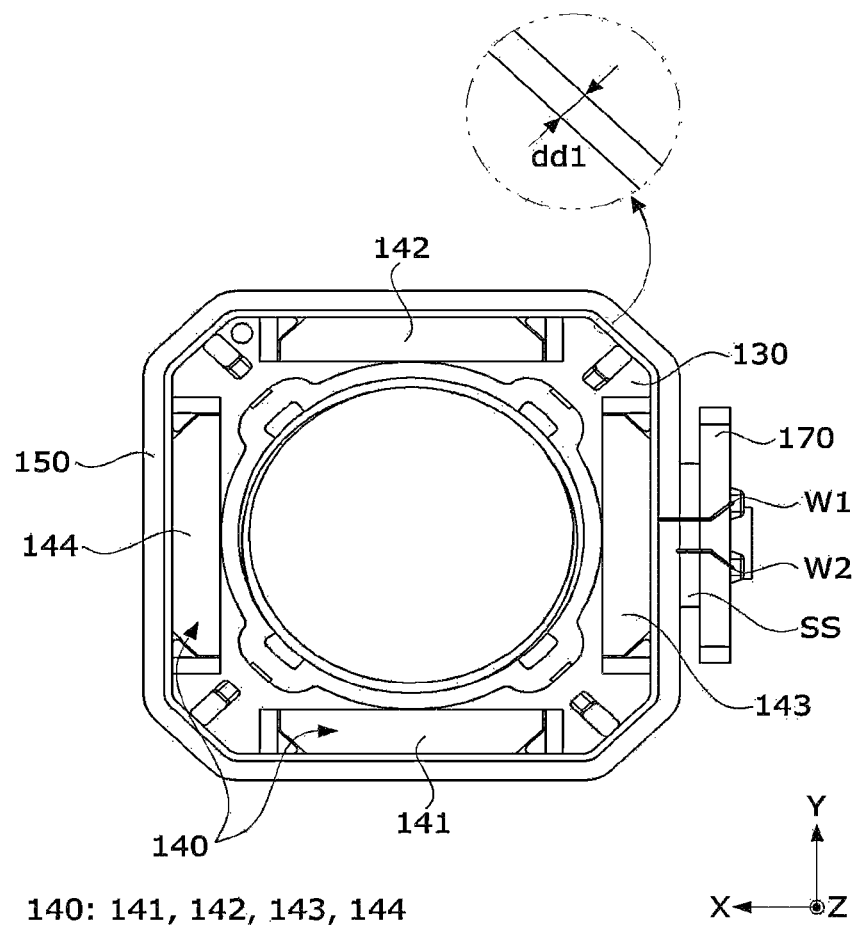
FIG. 12 is a top view of the driving magnet part, the driving coil part, a side substrate, and a control element of the light emitting unit according to the embodiment.
Figure 13:
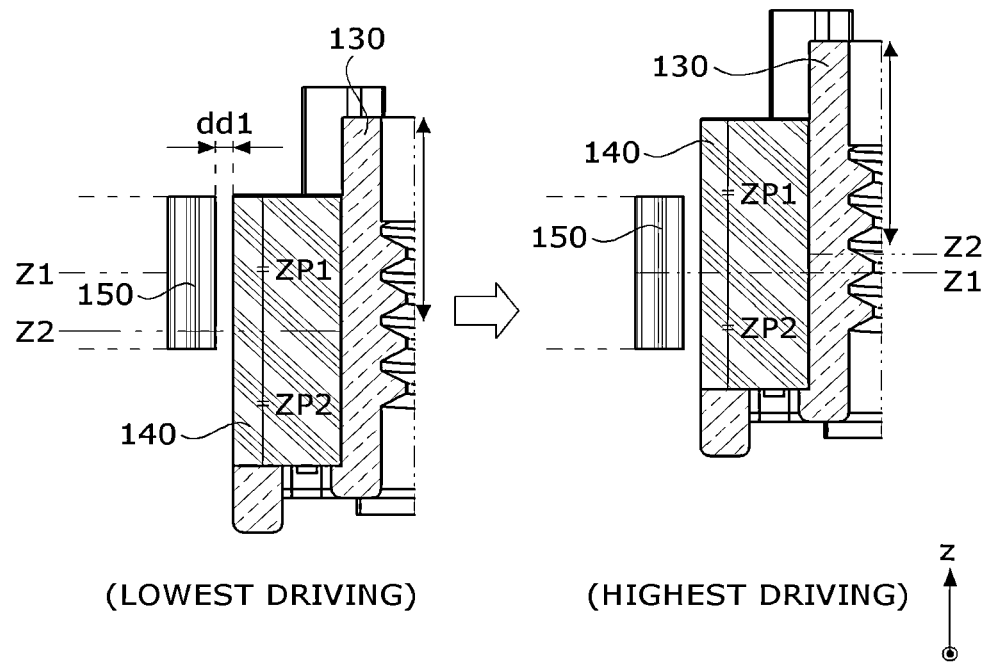
FIG. 13 is a view showing a positional relationship between the driving coil part and the driving magnet part according to the embodiment.

FIG. 10 is a view showing the driving magnet part and the driving coil part of the light emitting unit according to the embodiment, FIG. 11 is a view showing driving of the driving magnet part and the driving coil part of the light emitting unit according to the embodiment, FIG. 12 is a top view of the driving magnet part, the driving coil part, the side substrate, and the control element of the light emitting unit according to the embodiment, and FIG. 13 is a view showing a positional relationship between the driving coil part and the driving magnet part according to the embodiment.

Referring to FIGS. 10 to 12, the driving unit according to the embodiment may include the driving magnet part 140 and the driving coil part 150. The driving magnet part 140 may include the plurality of magnets.

In an embodiment, the driving magnet part 140 may include a first magnet 141 to a fourth magnet 144. The first magnet 141 and the second magnet 142 may be positioned to face each other. For example, the first magnet 141 and the second magnet 142 may be symmetrically disposed with respect to the first direction (X-axis direction).

The third magnet 143 and the fourth magnet 144 may be positioned to face each other and positioned between the first magnet 141 and the second magnet 142. For example, the third magnet 143 and the fourth magnet 144 may be symmetrically disposed with respect to the second direction (Y-axis direction).

The first magnet 141 to the fourth magnet 144 may be respectively positioned in the above-described first magnet seating groove to fourth magnet seating groove. The first magnet 141 to the fourth magnet 144 may be disposed to be spaced the same distance from each other with respect to the central axis HX. Therefore, a current flowing through the driving coil part 150 may interact with the magnetic force in a balanced manner and thus the first lens barrel may be moved in a balanced manner without tilting to one side by the electromagnetic force.

In addition, the first magnet 141 to the fourth magnet 144 may be unipolar-magnetized in each magnet seating groove. With this configuration, it is possible to generate a balanced electromagnetic force only with the driving coil part through which a current flows in a single direction.

Alternatively, the first magnet 141 to the fourth magnet 144 may be bipolar-magnetized in each magnet seating groove. At this time, unlike described below, each coil corresponding to the first magnet 141 to the fourth magnet 144 may be individually present. In this case, the movement of the first lens barrel may be more precisely controlled by controlling an amount of current flowing through each coil.

As described above, the driving coil part 150 may have a closed loop shape on the XY plane. Therefore, the driving coil part 150 may surround the driving magnet part 140. In other words, since the driving coil part 150 has the closed loop shape, the camera device may control each magnet of the driving magnet part 140 with one current. With this configuration, it is possible to inhibit a tilting phenomenon by the plurality of magnets with respect to the third direction. Therefore, the upper surface of the first optical part may move in a direction opposite to the light receiving unit (e.g., a direction opposite to the first direction) so that the first optical part may not be tilted. In addition, it is also possible to suppress a reduction in efficiency of the input light input to the light receiving unit due to the tilting.

The driving coil part 150 may be seated on the above-described coil seating portion. In addition, at least a portion of the driving coil part 150 and the driving magnet part 140 may overlap in the first direction (X-axis direction) or the second direction (Y-axis direction).

In addition, the driving coil part 150 may be disposed to surround the driving magnet part 140. In other words, the driving magnet part 140 may be positioned on the closed loop of the driving coil part 150.

In addition, when a current flows through the driving coil part 150, the first lens barrel and the driving magnet part 140 may move in the third direction (Z-axis direction) by the electromagnetic force.

For example, a current may flow through the driving coil part 150 counterclockwise. In addition, the first magnet 141 to the fourth magnet 144 may generate the magnetic fields outward. The movement of the first lens barrel by the electromagnetic force will be described below on the basis of the above content.

In this case, a magnetic field B1 is generated in a direction opposite to the second direction by the first magnet 141, and a current I1 flows in a direction opposite to the first direction in a region of the driving coil part 150 facing the first magnet 141. Therefore, an electromagnetic force F1 is generated in a direction opposite to the third direction (Z-axis direction) by the magnetic field B1 and the current I1.

In addition, a magnetic field B2 is generated in the second direction by the second magnet 142, and a current I2 flows in the first direction in a region of the driving coil part 150 facing the second magnet 142. Therefore, an electromagnetic force F2 is generated in the direction opposite to the third direction (Z-axis direction) by the magnetic field B2 and the current I2.

In addition, a magnetic field B3 is generated in the direction opposite to the first direction by the third magnet 143, and a current I3 flows in the second direction in a region of the driving coil part 150 facing the third magnet 143. Therefore, an electromagnetic force F3 is generated in the direction opposite to the third direction (Z-axis direction) by the magnetic field B3 and the current I3.

In addition, a magnetic field B4 is generated in the first direction by the fourth magnet 144, and a current I4 flows in the direction opposite to the second direction in a region of the driving coil part 150 facing the fourth magnet 144. Therefore, an electromagnetic force F4 is generated in the direction opposite to the third direction (Z-axis direction) by the magnetic field B4 and the current I4. At this time, the first lens barrel may move in the third direction (Z-axis direction) or upward by the electromagnetic forces F1 to F4. For example, since the driving coil part is fixed to the housing, the electromagnetic forces F1 to F4 may act on the driving magnets which are movable. In other words, when the electromagnetic forces F1 to F4 are generated in the directions opposite to the third direction (Z-axis direction), the driving magnet part 140 may move in the third direction (Z-axial direction).

In addition, when a current flows through the driving coil part 150 clockwise, the first lens barrel may move in the direction opposite to the third direction or downward.

In addition, the driving coil part 150 may be disposed to be spaced a first separation distance dd1 from the driving magnet part 140. The separation distance dd1 may be in a range of 70 μm to 90 μm. With this configuration, ease of assembly can be secured, and the movement of the first lens barrel according to the intensity of the electromagnetic force can be easily controlled. Furthermore, the electromagnetic force between the magnet and the coil may be 0.002 mN/mA when the separation distance dd1 is 90 μm.

In addition, the driving coil part 150 may be connected to a first wire W1 and a second wire W2 for electrically connecting the side substrate 170 to one end of the driving coil part 150. The first wire W1 and the second wire W2 may be electrically connected to the side substrate 170 and particularly disposed at positions corresponding to the side substrate 170, thereby minimizing electrical resistance. Therefore, it is possible to inhibit a reduction in accuracy due to resistance and increase power efficiency.

In addition, the first wire W1 and the second wire W2 may be respectively connected to one end and the other end of the driving coil part 150 formed of coils.

Therefore, a predetermined current may flow into the driving coil part 150 through the first wire W1 and the second wire W2 according to the control signal received by the side substrate 170, and the first lens barrel may be moved by the electromagnetic force by the flowing current or the like. Therefore, it is possible to arrange the side substrate 170 to be adjacent to the driving unit of the light emitting unit, thereby improving driving stability.

In addition, a rectifying element (e.g., a capacitor) may be disposed on the side substrate 170, and thus noise of the current supplied to the driving coil part may be removed by the rectifying element. Therefore, the first lens barrel may be accurately moved. In addition, since the rectifying element is not disposed on the main substrate, the camera device can be easily miniaturized.

In addition, the side substrate 170 may include a terminal disposed on a lower portion thereof and electrically connected to the main substrate. The terminal may be electrically connected to the main substrate through soldering or the like. With this configuration, a control signal, such as a current may be transmitted and received between the main substrate and the side substrate.

In addition, the control element SS may be mounted on the side substrate 170. The control element SS may be integrally formed with the side substrate. The control element SS may be positioned under the driving coil part 150. For example, the control element SS may be disposed under a lowermost portion of the driving coil part 150. In addition, at least a portion of the control element SS may be positioned to overlap the driving coil part 150 in the third direction (Z-axis direction). Therefore, the control element SS may accurately detect the intensity of the magnetic force from the driving magnet part 140 positioned inside the driving coil part 150. In addition, in the camera device according to the embodiment, the control element SS may detect the magnetic force generated from the driving magnet part without a separate magnet and calculate the position of the first lens module or provide a signal indicating the position. Therefore, it is possible to easily make the light emitting unit compact.

In addition, the control element SS and the driving magnet part, particularly, the third magnet, may have a predetermined separation distance from each other. The separation distance may be in a range of 0.44 mm to 0.66 mm. With this configuration, a magnetic force or detection values detected by the control element corresponding to the position of the first lens module may be linear. Therefore, it is possible to increase accuracy of the position detection of the control element.

In addition, a height T1 of the driving coil part 150 in the third direction (Z-axis direction) may be smaller than a height T2 of each magnet or driving magnet part in the third direction (Z-axis direction). With this configuration, the driving coil part 150 may be positioned to overlap the driving magnet part 140 in the first direction (X-axis direction) and the second direction (Y-axis direction) even when the first lens barrel and the driving magnet part 140 move in the third direction (Z-axis direction).

Referring to FIG. 13, when the first lens barrel is positioned on the lowermost portion (hereinafter referred to as "lowest driving"), the driving coil part 150 and the driving magnet part 140 may overlap in a moving direction, that is, on the direction perpendicular to the XY plane or in the third direction (Z-axis direction). Alternatively, an upper surface of the driving coil part 150 may be positioned at least under an upper surface of the driving magnet part 140 upon the lowest driving.

Furthermore, even when the first lens barrel is positioned at an uppermost portion (hereinafter referred to as "highest driving"), the driving coil part 150 and the driving magnet part 140 may overlap on the XY plane. Alternatively, a lower surface of the driving coil part 150 may be positioned at least above a lower surface of the driving magnet part 140 upon the highest driving.

In other words, the driving coil part 150 according to the embodiment may overlap the driving magnet part 140 in the direction perpendicular to the third direction (Z-axis direction) even when the driving magnet part 140 moves (e.g., the lowest driving or the highest driving).

In addition, a first center or a first central axis Z1 bisecting the driving coil part 150 in the third direction may be positioned in a first magnet region ZP1 of the driving magnet part 140.

In an embodiment, the driving magnet part 140 may include the first magnet region ZP1 and a second magnet region ZP2. The first magnet region ZP1 may be positioned above the second magnet region ZP2, and the second magnet region ZP2 may be positioned under the first magnet region ZP1. The first magnet region ZP1 and the second magnet region ZP2 may be partitioned with respect to a second center or a second central axis Z2 bisecting the driving magnet part 140 in the third direction.

In this case, the first central axis Z1 of the driving coil part 150 may be positioned on the first magnet region ZP1 upon the lowest driving or the highest driving. With this configuration, it is possible to increase the magnitude of the electromagnetic force generated between the driving unit, that is, the driving magnet part 140 and the driving coil part 150 upon the lowest driving or the highest driving.

Furthermore, the current applied to the driving coil part may be greater upon the highest driving than upon the lowest driving. However, according to the embodiment, a separation distance between the first central axis Z1 and the second central axis Z2 may be smaller upon the highest driving than upon the lowest driving. Therefore, it is possible to reduce the amount of the current applied to the driving coil part upon the highest driving, thereby increasing energy efficiency.

With this configuration, an overlapping region on the XY plane between the driving coil part 150 and the driving magnet part 140 may be constant. Therefore, a change of the electromagnetic force, which is generated by the driving coil part 150 and the driving magnet part 140, according to the position (particularly, the position in the Z-axis direction) between the driving coil part 150 and the driving magnet part 140 can be minimized. In other words, the driving or movement of the first lens barrel by the electromagnetic force may be linear to the change in the current. In other words, the first lens barrel may be accurately moved.

In addition, upon the lowest driving, a region of the driving coil part 150 overlapping the first magnet region ZP1 in the direction perpendicular to the optical axis or third direction (Z-axis direction) may be greater than a non-overlapping region. Furthermore, upon the highest driving, a region of the driving coil part 150 overlapping the first magnet region ZP1 in the direction perpendicular to the optical axis or third direction (Z-axis direction) may be greater than a region of the driving coil part 150 overlapping the second magnet region ZP2 in the direction perpendicular to the optical axis or third direction (Z-axis direction). In addition, upon the highest driving, the lowermost portion of the driving coil part 150 may be positioned above a lowermost portion of the driving magnet part 140.

Figure 14:
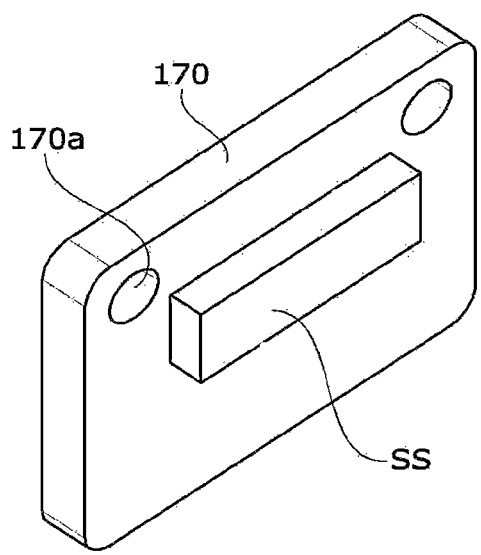
FIG. 14 is a view showing one side of the side substrate of the light emitting unit according to the embodiment.
Figure 15:
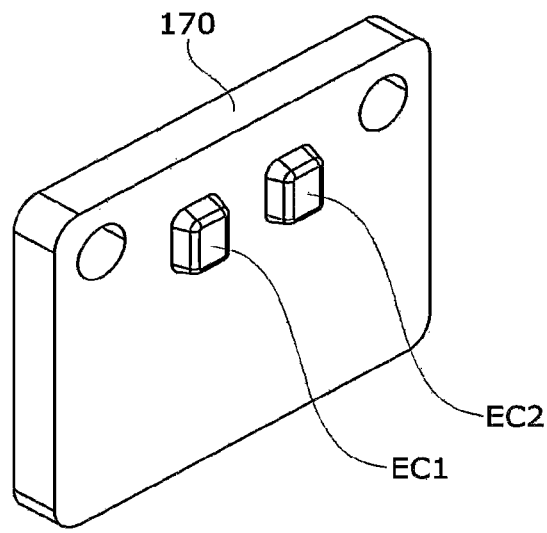
FIG. 15 is a view showing the other side of the side substrate of the light emitting unit according to the embodiment.

FIG. 14 is a view showing one side of the side substrate of the light emitting unit according to the embodiment, and FIG. 15 is a view showing the other side of the side substrate of the light emitting unit according to the embodiment.

Referring to FIGS. 14 and 15, the side substrate 170 may have one side surface and the other side surface opposite to the one side surface to be in contact with the housing.

The side substrate 170 may include first and second conductive portions EC1 and EC2 connected to the first and second wires of the driving coil part on one side surface thereof. In addition, the side substrate 170 may include a coupling hole 170a in the other side surface thereof. As described above, the coupling hole 170a may be coupled to the coupling protrusion of the housing. Therefore, the side substrate 170 may be coupled to the side surface of the housing.

In addition, the control element SS may be positioned on the other side surface of the side substrate 170. The control element SS may be seated on the other side surface of the side substrate 170 and inserted into the hole.

Figure 16:
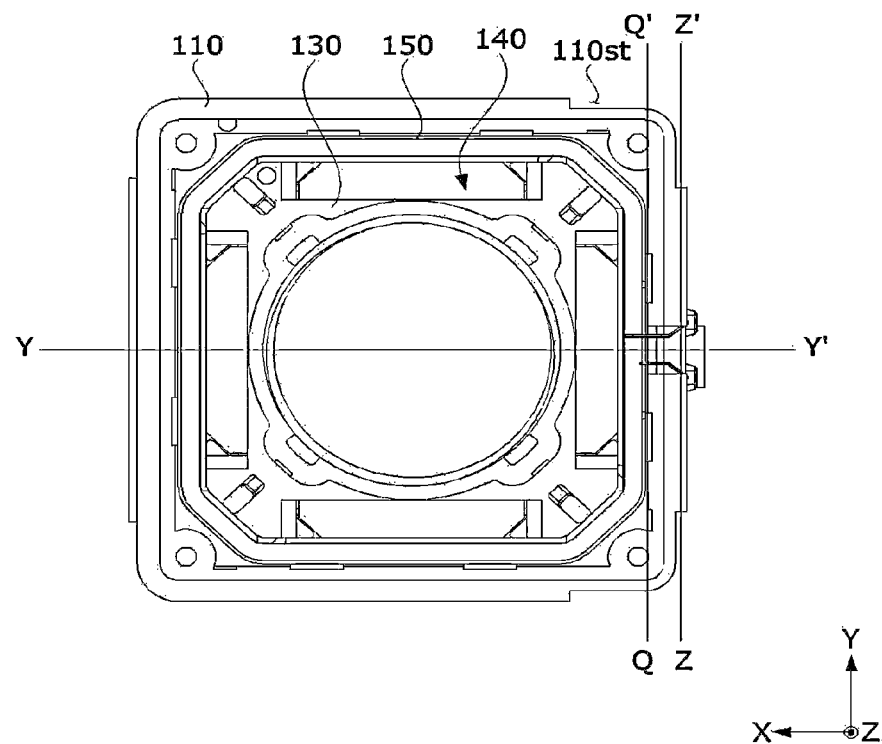
FIG. 16 is a top view of the first lens barrel, the driving magnet part, the driving coil part, the housing, the side substrate, and the control element of the light emitting unit according to the embodiment.
Figure 17:
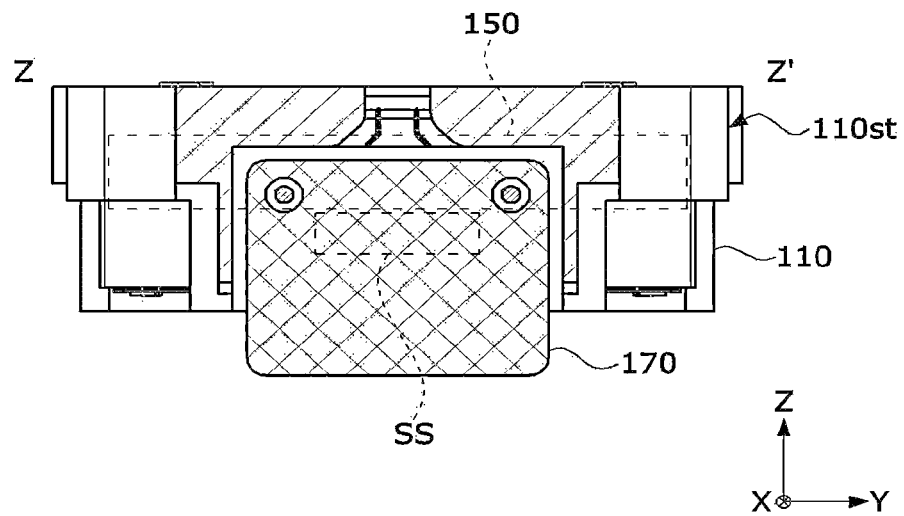
FIG. 17 is a cross-sectional view along line Z-Z' in FIG. 16.
Figure 18:
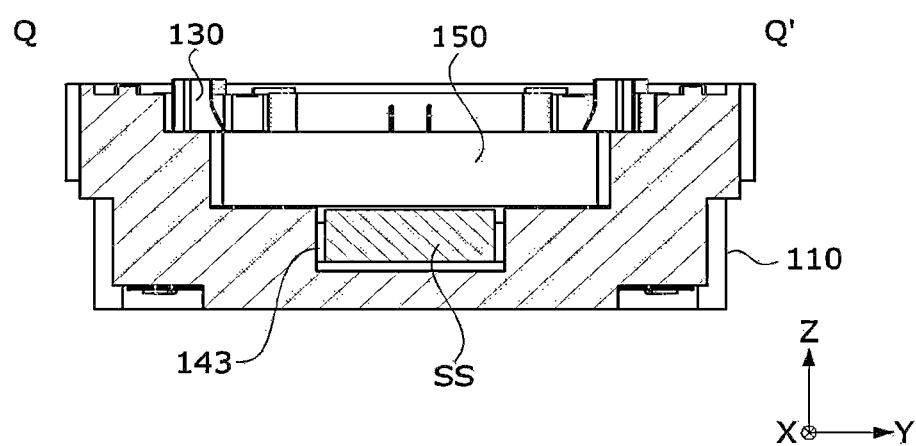
FIG. 18 is a cross-sectional view along line Q-Q' in FIG. 16.
Figure 19:
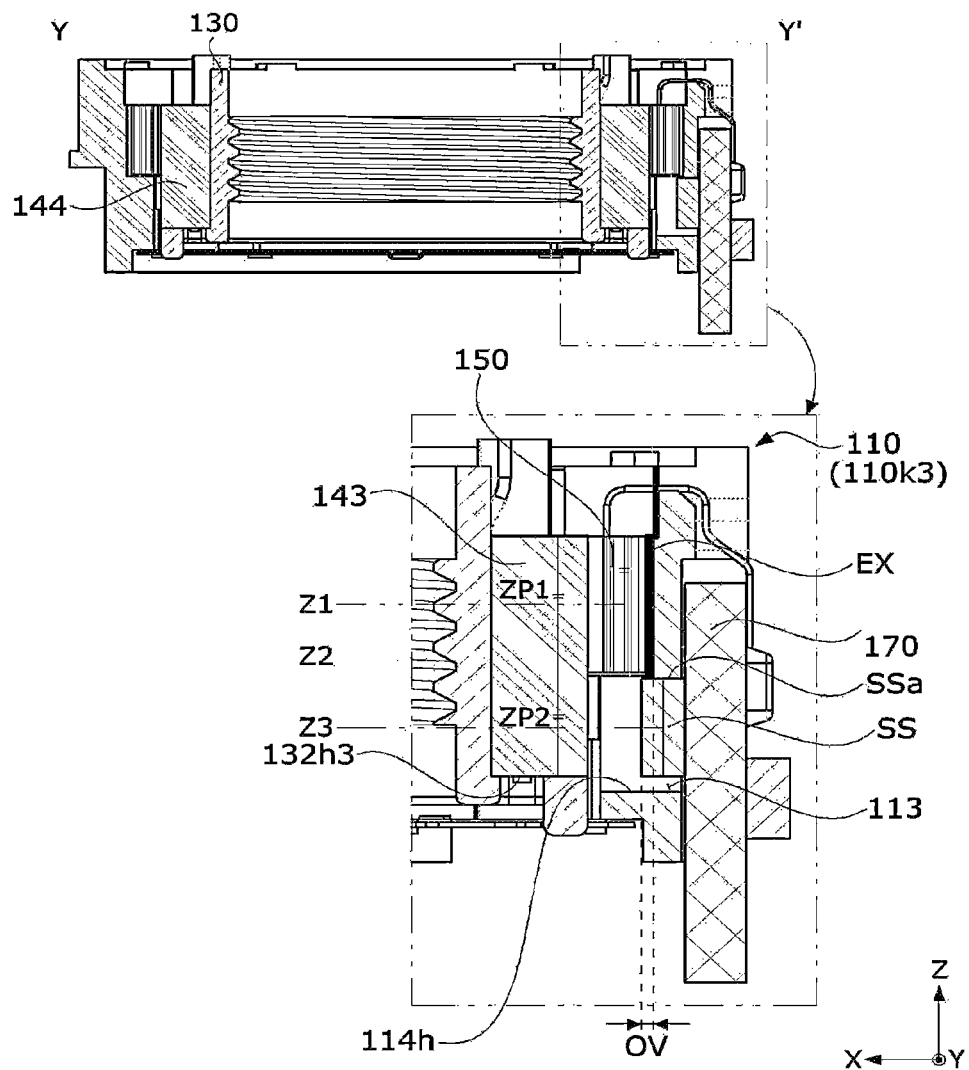
FIG. 19 is a cross-sectional view along line Y-Y' in FIG. 16.

FIG. 16 is a top view of the first lens barrel, the driving magnet part, the driving coil part, the housing, the side substrate, and the control element of the light emitting unit according to the embodiment, FIG. 17 is a cross-sectional view along line Z-Z' in FIG. 16, FIG. 18 is a cross-sectional view along line Q-Q' in FIG. 16, and FIG. 19 is a cross-sectional view along line Y-Y' in FIG. 16.

Referring to FIGS. 16 to 19, the hole 113 and the seating groove 114h in the housing 110 according to the embodiment may overlap in the first direction (X-axis direction). In addition, as described above, the hole 113 and the seating groove 114h may be located in the third housing side portion 110k3 having the greatest minimum separation distance from the light receiving unit in the housing.

In addition, the side substrate 170 may include the first and second conductive portions disposed on the outer surface thereof and include the control element SS disposed on the inner surface thereof.

In addition, the control element SS may be seated in the hole 113. In addition, at least a portion of the control element SS may overlap the seating groove 114*h*. In addition, the control element SS may be positioned under the coil seating portion 114, that is, under the driving coil part 150.

In addition, at least a portion of the control element SS according to the embodiment may overlap the third magnet 143 facing the third housing side portion 110*k*3 in the first direction (X-axis direction). In addition, since the seating groove 114*h* is positioned between the control element SS and the third magnet 143, the seating groove 114*h* is open so that the control element SS may easily detect the magnetic force generated from the third magnet 143.

In addition, at least a portion OV of the control element SS may overlap the driving coil part 150 in the third direction (Z-axis direction). Therefore, when a coupling member EX, such as epoxy, is applied to the third housing side portion 110*k*3, the coupling member EX may be positioned on an upper surface SSa of the control element SS. Therefore, the upper surface SSa of the control element SS and an upper surface of the hole 113 may be coupled by the coupling member. In other words, a position of the driving coil part 150 may be guided along the coil seating portion 114, and a position of the control element SS may be guided by the hole 113 and the seating groove 114*h*. Therefore, the control element SS and the driving coil part 150 may be accurately disposed at designed positions. Therefore, the camera device according to the embodiment may accurately adjust the shape of the input light according to a distance.

In addition, the control element SS may be disposed under the driving coil part 150, and at least a portion of the coupling member EX described above may be positioned between the control element SS and the driving coil part 150. In other words, at least a portion of the coupling member EX may overlap the control element SS and the driving coil part 150 in the third direction. With this configuration, the coupling member EX can block the magnetic field generated from the driving coil part 150 from acting as noise to the control element SS. Therefore, a position of the optical unit may be accurately detected by the control element SS.

Furthermore, when the first optical part converts the light into a point shape, a third central axis Z3 of the control element SS may overlap the driving magnet part 140 in the direction perpendicular to the third direction or on the XY plane.

In addition, when the first optical part converts the light into a planar shape, the third central axis Z3 of the control element SS may not overlap the driving magnet part 140 in the direction perpendicular to the third direction or on the XY plane.

Therefore, the separation distance between the driving magnet part 140 and the control element SS may be reduced when the light has the point shape compared to the planar shape, and thus the position of the first optical part may be accurately detected through the control element SS. Therefore, by precisely detecting the position of the first optical part, eye-safety control (e.g., notification) may be easily performed when the light has the point shape.

In addition, the housing 110 may include a stepped portion 110*st* positioned on the side surface thereof. In other words, the stepped portion 110*st* may be positioned or formed on a side surface of the housing side portion of the housing 110. The stepped portion 110*st* may be positioned on a facing surface in the second direction (Y-axis direction) and a side surface of the housing that are spaced apart from the light receiving unit. In other words, the outer surface of the housing 110 may have a groove due to the stepped portion 110*st*. In an embodiment, the stepped portion may have a structure that is bent inward from the outer surface of the housing 110. Therefore, the outer surface of the housing 110 on the stepped portion may be positioned inside the outer surface of the housing 110 in regions other than the stepped portion. With this configuration, the housing 110 may be seated on the first base and easily coupled to the first base as will be described below. In addition, the stepped portion of the housing 110 may be seated in a second groove to be described below. For example, the stepped portion of the housing 110 may be seated in a 2-2 groove (corresponding to G2*b* in FIG. 26). With this configuration, the stepped portion 110*st* of the housing 110 or the 2-2 groove may serve as an alignment mark. Therefore, it is possible to improve left and right asymmetry between the housing 110 and the base.

Figure 20:
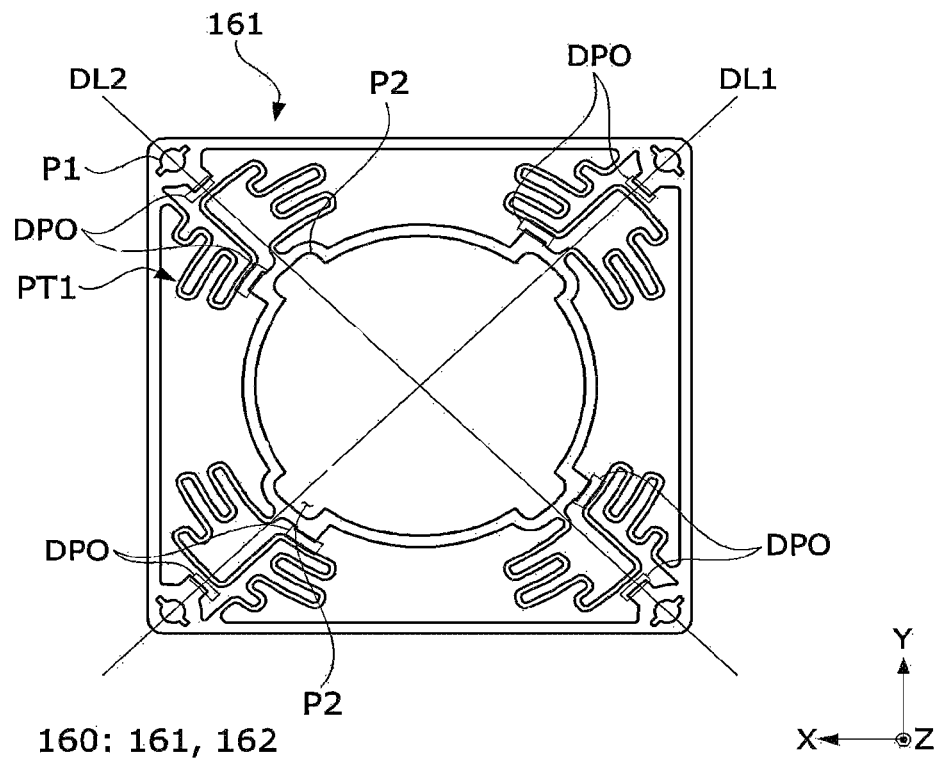
FIG. 20 is a view showing a first elastic member of the light emitting unit according to the embodiment.
Figure 21:
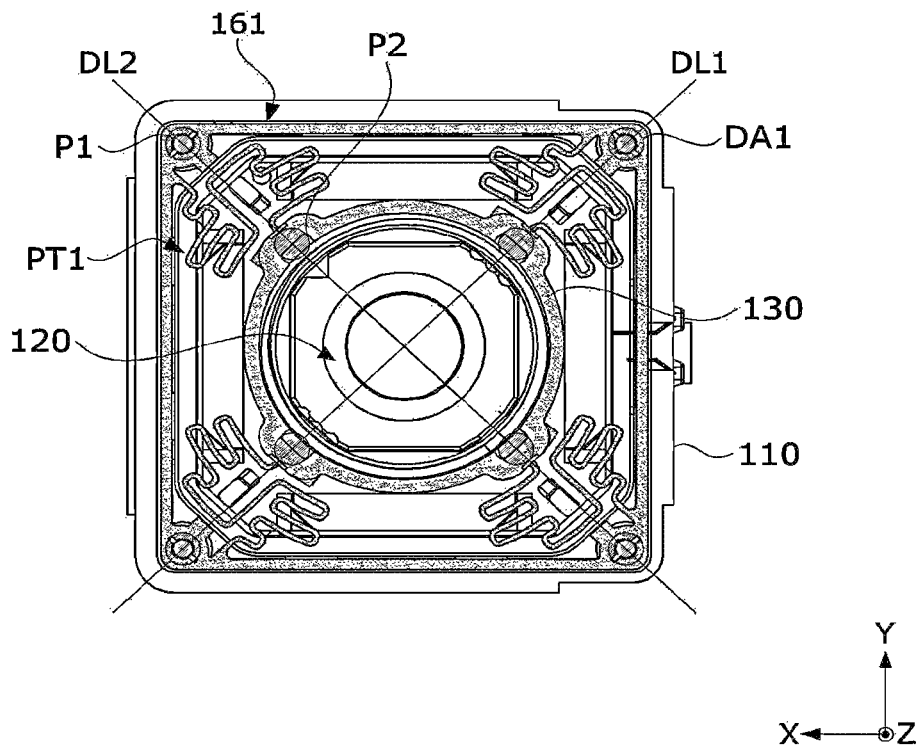
FIG. 21 is a view showing coupling of the first elastic member of the light emitting unit according to the embodiment.
Figure 22:
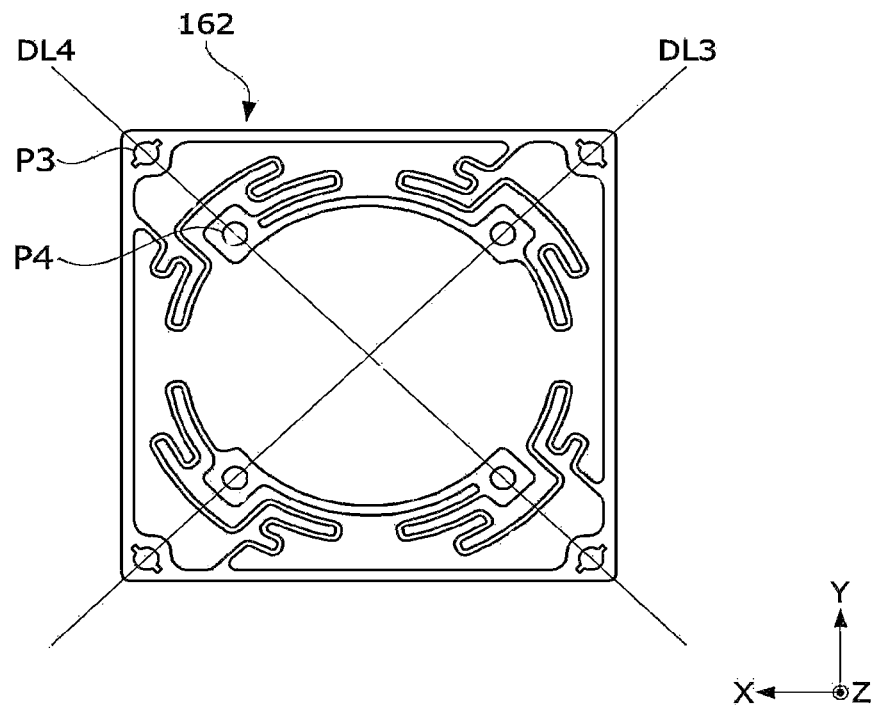
FIG. 22 is a view showing a second elastic member of the light emitting unit according to the embodiment.
Figure 23:
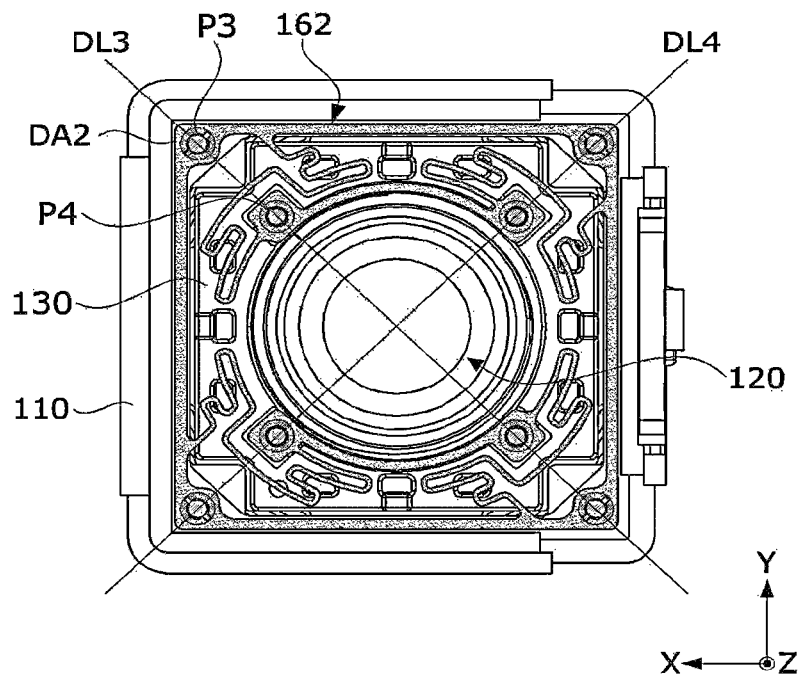
FIG. 23 is a view showing coupling between the light emitting unit and the second elastic member according to the embodiment.

FIG. 20 is a view showing a first elastic member of the light emitting unit according to the embodiment, and FIG. 21 is a view showing coupling of the first elastic member of the light emitting unit according to the embodiment. In addition, FIG. 22 is a view showing a second elastic member of the light emitting unit according to the embodiment, and FIG. 23 is a view showing coupling between the light emitting unit and the second elastic member according to the embodiment.

Referring to FIGS. 20 to 23, the elastic part 160 may include a first elastic member 161 and a second elastic member 162. The elastic part 160 may be positioned above or under the first lens barrel 130 and coupled to the housing 110 and the first lens barrel 130. Therefore, even when the first lens barrel 130 moves up or down by the driving unit, a preload may be applied to the vertical movement of the first lens barrel 130 through the elastic part 160 coupled to the housing 110. Therefore, when a current is not applied to the driving coil part, the first lens barrel 130 may be present at the same position in the housing 110 by a restoring force of the elastic part 160.

The first elastic member 161 may be positioned above the first lens barrel 130. The second elastic member 162 may be positioned under the first lens barrel 130.

The first elastic member 161 may include a first elastic coupling portion P1 and a second elastic coupling portion P2. The first elastic coupling portion P1 may be positioned outside the second elastic coupling portion P2. In addition, the first elastic coupling portion P1 may be coupled to a protrusion of the housing 110. In addition, the second elastic coupling portion P2 may be coupled to the first lens barrel 130. In this case, a coupling member DA1 may be applied to the first elastic coupling portion P1 and the second elastic coupling portion P2 for the above-described coupling. The coupling member may include epoxy or the like. In addition, the coupling member may also be, for example, a damper liquid. Furthermore, each of the first elastic coupling portion P1 and the second elastic coupling portion P2 may further include an additional groove extending to one side thereof so that the coupling member may be easily applied.

In addition, a first pattern portion PT1 having various curves may be positioned between the first elastic coupling portion P1 and the second elastic coupling portion P2. In other words, the first elastic coupling portion P1 and the second elastic coupling portion P2 may be coupled with the first pattern portion PT1 interposed therebetween.

Furthermore, each of the first elastic coupling portion P1 and the second elastic coupling portion P2 may have a hole or groove shape and have a shape to have an assembly tolerance with the housing or the first lens barrel coupled thereto.

In addition, the first pattern portion PT1 may be symmetrically disposed with respect to a first diagonal line DL1 or a second diagonal line DL2. The first diagonal line DL1 may be a virtual line connecting a contact point between the first housing side portion and the fourth housing side portion and a contact point between the second housing side portion and the third housing side portion. In addition, the second diagonal line DL2 may be a virtual line connecting a contact point between the housing side portion and the third housing side portion and a contact point between the second housing side portion and the fourth housing side portion.

In addition, a damping member may be applied on the first pattern portion PT1. The damping member may include a damper liquid. The generation of vibrations of the elastic part may be suppressed by the damper liquid. The damping member may be applied to the first pattern portion PT1. In addition, the damping member may be disposed to be spaced apart from the housing. Therefore, it is possible to reduce vibrations generated from the first pattern portion PT1 and block a malfunction caused by coupling between the housing and a spring. More specifically, the damping member may be applied to a region DPO of the first pattern portion PT1 adjacent to the first elastic coupling portion P1 or the second elastic coupling portion P2. Therefore, since the first pattern portion PT1 is coupled to the first elastic coupling portion P1 and the second elastic coupling portion P2 which have little vibrations, it is possible to enhance vibration suppression.

In addition, the first elastic coupling portion P1 and the second elastic coupling portion P2 described above may be positioned on the first diagonal line DL1 or the second diagonal line DL2. With this configuration, it is possible to inhibit a phenomenon that the coupling member is applied on the magnet or the first optical part 120 even when the coupling member is applied to the first elastic coupling portion P1 and the second elastic coupling portion P2. Therefore, it is possible to inhibit the first elastic member 161 from being coupled to members other than the housing 110 or the first lens barrel 130, and thus a preload may be uniformly applied between the housing and the first lens member. Therefore, the vertical movement of the first lens barrel may be performed linearly, that is, accurately according to the control.

In addition, when the first lens barrel 130 moves up or down, that is, in the third direction (Z-axis direction), the occurrence of tilt or movement with respect to the first direction (X-axis direction) or the second direction (Y-axis direction) can be suppressed by the first elastic coupling portion P1 and the second elastic coupling portion P2 on the first diagonal line DL1 and/or the second diagonal line DL2.

The first pattern portion PT1 may be designed with a modulus of elasticity of the first elastic member 161 linearly corresponding to the electromagnetic force and the vertical moving distance of the first lens barrel. Furthermore, as will be described below, the first and second elastic members 161 and 162 may be disposed above and under the first lens barrel, thereby minimizing the influence of momentum on the vertical movement of the first lens barrel 130.

In addition, the first elastic member 161 may have a shape in which a safety factor of the elastic member is greater than or equal to a critical value so that shape deformation is not caused by an impact or the like. In other words, a safety factor of the first elastic member in the first direction or the second direction may be greater than a safety factor of the first elastic member in the third direction. Therefore, durability against an impact applied in the first direction or the second direction may be stronger.

Likewise, the second elastic member 162 may include a third elastic coupling portion P3 and a fourth elastic coupling portion P4. The third elastic coupling portion P3 may be positioned outside the fourth elastic coupling portion P4.

In addition, the third elastic coupling portion P3 may be coupled to the protrusion of the housing 110. In addition, the fourth elastic coupling portion P4 may be coupled to the first lens barrel 130. In this case, a coupling member DA2 is also applied to the third elastic coupling portion P3 and the fourth elastic coupling portion P4 so that the above-described coupling may be implemented.

The coupling member may include epoxy or the like. In addition, the coupling member may also be, for example, a damper liquid. Furthermore, each of the third elastic coupling portion P3 and the fourth elastic coupling portion P4 may further include an additional groove extending to one side thereof so that the coupling member may be easily applied.

In addition, a second pattern portion PT2 having various curves may be positioned between the third elastic coupling portion P3 and the fourth elastic coupling portion P4. In other words, the third elastic coupling portion P3 and the fourth elastic coupling portion P4 may be coupled with the second pattern portion PT2 interposed therebetween.

Furthermore, each of the third elastic coupling portion P3 and the fourth elastic coupling portion P4 may have a hole or groove shape and have a shape to have an assembly tolerance with the housing or the first lens barrel coupled thereto.

In addition, the second pattern portion PT2 may be symmetrically disposed with respect to a third diagonal line DL3 or a fourth diagonal line DL4. The third diagonal line DL3 may be a virtual line connecting a contact point between the first housing side portion and the fourth housing side portion and a contact point between the second housing side portion and the third housing side portion. In addition, the fourth diagonal line DL4 may be a virtual line connecting a contact point between the housing side portion and the third housing side portion and a contact point between the second housing side portion and the fourth housing side portion.

In addition, a damping member may be applied on the second pattern portion PT2. The damping member may include a damper liquid. The generation of vibrations of the elastic part may be suppressed by the damper liquid. The damping member may be applied to the second pattern portion PT2.

In addition, the third elastic coupling portion P3 and the fourth elastic coupling portion P4 described above may be positioned on the third diagonal line DL3 or the fourth diagonal line DL4. With this configuration, it is possible to inhibit a phenomenon that the coupling member is applied on the magnet or the first optical part 120 even when the coupling member is applied to the third elastic coupling portion P3 and the fourth elastic coupling portion P4. Therefore, it is possible to inhibit the second elastic member 162 from being coupled to members other than the housing 110 or the first lens barrel 130, and thus a preload may be uniformly applied between the housing and the first lens member. Therefore, the vertical movement of the first lens barrel may be linearly performed according to the control, and thus the vertical movement may be accurately controlled.

In addition, when the first lens barrel 130 moves up or down, that is, in the third direction (Z-axis direction), the occurrence of tilt or movement with respect to the first direction (X-axis direction) or the second direction (Y-axis direction) can be suppressed by the third elastic coupling portion P3 and the fourth elastic coupling portion P4 on the third diagonal line DL3 and/or the fourth diagonal line DL4.

The second pattern portion PT2 may be designed with a modulus of elasticity of the second elastic member 162 linearly corresponding to the electromagnetic force and the vertical movement distance of the first lens barrel. Furthermore, as will be described below, the first and second elastic members 161 and 162 may be disposed above and under the first lens barrel, thereby minimizing the influence of momentum on the vertical movement of the first lens barrel 130.

In addition, the second elastic member 162 may have a shape in which a safety factor of the elastic member is greater than or equal to a critical value so that shape deformation is not caused by an impact or the like. In other words, a safety factor of the second elastic member in the first direction or the second direction may be greater than a safety factor of the second elastic member in the third direction. Therefore, durability against an impact applied in the first direction or the second direction may be stronger.

Figure 24:
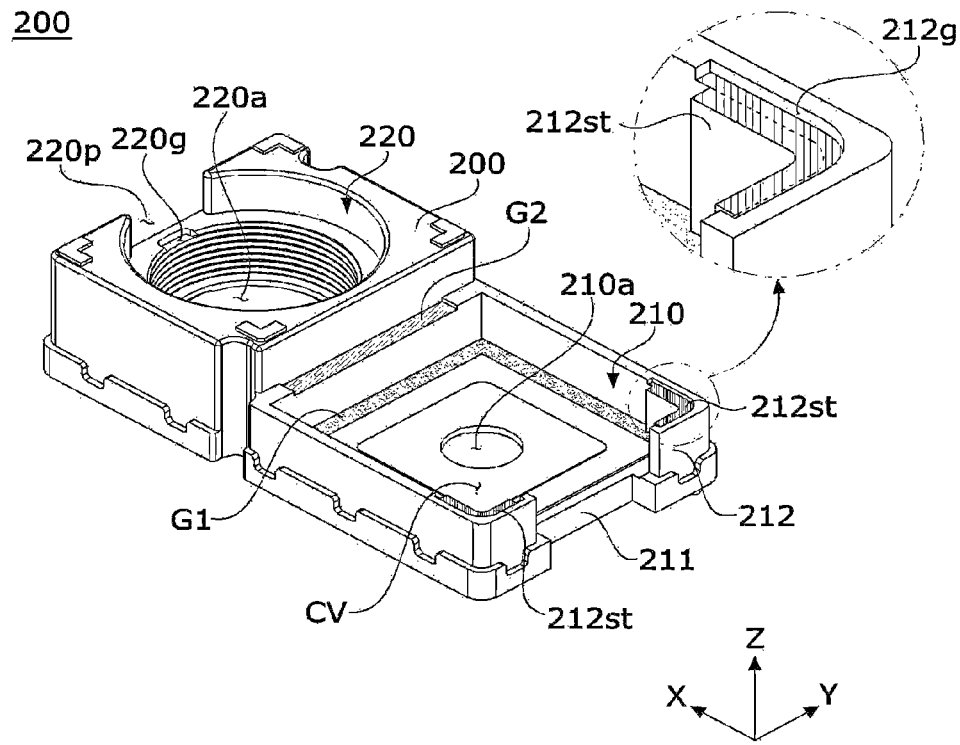
FIG. 24 is a view showing a base of the camera device according to the embodiment.

FIG. 24 is a view showing a base of the camera device according to the embodiment.

Referring to FIG. 24, the base 200 may be positioned on the main substrate 4 and may be in contact with the main substrate 4. In addition, the above-described first lens barrel, first optical part, second lens barrel, second optical part, and housing may be seated on the base 200.

The base 200 may include a first base 210 and a second base 220 disposed to be spaced apart from each other. The first base 210 and the second base 220 may be disposed to be spaced apart from each other in the first direction (X-axis direction). The first base 210 and the second base 220 may be integrally formed. Alternatively, the first base 210 and the second base 220 may have a separate structure. In an embodiment, the following description will be made on the basis of the fact that the first base 210 and the second base 220 are integrally formed, and thus it is possible to increase the stiffness of the base 200, thereby increasing the reliability of the camera device.

The housing (or the components of the light emitting unit, such as the first optical part and the first lens barrel) may be seated on the first base 210. In other words, the first base 210 may accommodate the housing (or the components of the light emitting unit, such as the first optical part and the first lens barrel).

In addition, the second base 220 may be disposed adjacent to the first base 210 so that the second optical part and the second lens barrel are seated thereon. An image sensor may be positioned under the second base 220.

The first base 210 and the second base 220 may include base holes 210a and 220a, respectively. An optical signal may be output from the light source to an object through the base holes 210a and 220a, and an optical signal (reflected light) reflected from the object may be provided to the image sensor. For example, an optical signal may be output to the object through the first base hole 210a, and an optical signal reflected through the second base hole 220a may be provided to the image sensor.

In addition, the above-described filter may be seated on each of the first base 210 and the second base 220. Furthermore, the first base 210 and the second base 220 are shown as being integrated but may be separated. In addition, the first base 210 and the second base 220 may have a separate structure.

In the camera device according to the embodiment, the light receiving unit 2 may also have a structure separated from the light emitting unit 1. Therefore, in the camera device, the main substrate may also be divided into a first substrate and a second substrate, and the first base may be seated on the first substrate and the second base may be seated on the second substrate. In addition, the camera device may include the housing coupled to the base and the light emitting unit including the optical part disposed in the housing. In this case, the camera device may include a first cover. The same configuration as described above or below may be applied to a specific configuration of each component. In addition, the first cover may correspond to a cover to be described below, and the cover may also have a structure that is divided into the first cover on the first base and a second cover on the second base. In other words, the distance measuring camera device may include the first substrate, the first base disposed on the first substrate, the housing coupled to the first base, and the light emitting unit including the optical part disposed in the housing.

Furthermore, the light receiving unit in the distance measuring camera device may include the second substrate separated from the first substrate, the image sensor disposed on the second substrate, and the second base disposed on the second substrate and separated from the first base. Furthermore, the light receiving unit may further include the second cover.

In addition, the distance measuring camera device may include a single substrate or an integrated substrate without separating the first substrate and the second substrate. In addition, the first base and the second base separated from each other may be seated on the integrated substrate. In addition, the camera device may have only the second cover without the first cover or also have only the first cover without the second cover.

As described above, the main substrate, the base, and the cover in the distance measuring camera device may be formed with a separate structure or an integrated structure. When separated, each of the main substrate, the base, and the cover may correspond to one component of the light emitting unit and the light receiving unit.

In addition, the second base 220 may be tilted as described above, and the filter attached to the second base 220 may also be tilted so that the camera device according to the embodiment may perform a super resolution technique.

More specifically, the first base 210 according to the embodiment may include a body 211 and a side wall 212 having a cavity CV therein.

The body 211 may be positioned on a lower portion of the first base 210. Therefore, the body 211 may be in contact with the main substrate. In other words, the body 211 may be supported by the main substrate. In addition, the body 211 may be used interchangeably with a "bottom portion," and a bottom surface of the first base 210 may be the bottom portion or an upper surface of the body.

The side wall 212 may be disposed along an edge of the body 211 above the body 211. In other words, the side wall 212 may be disposed on the bottom portion or the bottom surface of the first base 210.

In an embodiment, the side wall 212 may have the cavity CV therein, and as described above, the housing (or the components of the light emitting unit, such as the first optical part and the first lens barrel) may be seated in the cavity CV.

Furthermore, a first bonding member to be described below may be disposed between the bottom portion, which is the body 211, and the housing 110. In addition, the first bonding member may be disposed between the bottom portion, which is the body 211, and the lower surface of the housing 110. Therefore, the first bonding member may be in contact with the body 211 or the bottom portion and couple the base and the housing.

In addition, a second bonding member may be disposed to be spaced apart from the first bonding member in the optical axis direction and disposed between the side wall and the housing in the first base. For example, the first bonding member may be positioned inside the second bonding member. In addition, the second bonding member may be positioned above the first bonding member.

In addition, the second bonding member may be disposed between the stepped portion of the housing and the side wall. Therefore, the second bonding member may be in contact with the stepped portion of the housing and the side wall of the base and couple the stepped portion and the side wall. In other words, the second bonding member may couple the housing and the base and increase the coupling force between the housing and the base. Specifically, the body 211 according to the embodiment may include a first groove G1 disposed along an edge of the cavity CV. The first groove G1 may be located inside the side wall 212. Therefore, the first groove G1 may not overlap the side wall 212 in the vertical direction (Z-axis direction).

In addition, the first bonding member may be applied to the first groove G1. For example, the first bonding member may be made of a resin-based material and may include epoxy or the like but is not limited to these materials. The first bonding member may bond the first base 210 and the housing. In other words, the first bonding member may couple the first base 21 and the housing.

Furthermore, the side wall 212 according to the embodiment may include a side wall protrusion 212st positioned on an inner surface thereof and protruding inward. Furthermore, the side wall 212 may include a side wall groove 212g positioned to correspond to the side wall protrusion 212st and located in an upper surface of the side wall 212. In the specification, the side wall groove 212g may correspond to the 2-2 groove. For example, the side wall groove 212g may be used interchangeably with the 2-2 groove.

The side wall protrusion 212st may be positioned to correspond to the above-described stepped portion of the housing. In addition, the side wall groove 212g may also be positioned to correspond to the stepped portion of the housing. Therefore, the side wall protrusion 212st may be positioned to face the outer surface of the housing, and at least a portion of the stepped portion disposed on the side surface of the housing may be seated in the side wall groove 212g. In addition, a second adhesive member may be in the side wall groove 212g or the 2-2 groove, and the housing and the first base may be coupled by the second adhesive member.

Furthermore, the position of the housing on the first base may be guided by the side wall protrusion 212st and the 2-2 groove. Therefore, the housing may be easily seated at a desired position of the first base. In other words, it is possible to increase the structural stability of the housing in the first base. In addition, in an embodiment, the side wall 212 may include a second groove G2 in which the housing is seated. The second groove G2 may be positioned on the upper surface of the side wall 212. In an embodiment, the second groove G2 may be positioned outside the first groove G1 or the cavity CV.

In addition, the second bonding member may be applied to the second groove G2. In other words, the second bonding member may be seated in the second groove G2. The second bonding member may be made of, for example, a resin-based material and may include epoxy or the like.

In addition, the second bonding member may be in contact with a portion of the housing side portion of the housing. In addition, the second bonding member may be in contact with the first base 210 or the second groove G2. In other words, the second bonding member may couple the first base 210 and the housing.

In addition, the second bonding member may be made of a material cured by light in a predetermined wavelength band. For example, the second bonding member may be cured by light in an ultraviolet wavelength band. In addition, the first bonding member may be cured by predetermined heat. Alternatively, the second bonding member may also be additionally cured by the predetermined heat like the first bonding member.

Therefore, for the coupling between the housing (or the components of the light emitting unit, such as the first optical part and the first lens barrel) and the first base 210 through the first bonding member and the second bonding member, the housing (or the components of the light emitting unit, such as the first optical part and the first lens barrel) may easily move in the first direction (X-axis direction) or the second direction (Y-axis direction) to be positionally aligned in a state of being seated on the first base 210.

In addition, as the housing (or the components of the light emitting unit, such as the first optical part and the first lens barrel) moves, correction to an optical axis displacement (optical axis alignment) may be performed for light emission on the first base 210. Thereafter, the housing and the first base 210 may be easily coupled primarily by radiating light (e.g., ultraviolet rays) to the second groove G2.

In addition, heat may be applied to cure the first bonding member (or the second bonding member), thereby further increasing the coupling force between the housing and the first base 210. A specific description thereof will be made below.

In addition, the second base 220 may include a base opening 220p disposed in a side surface thereof. The base opening 220p may be disposed opposite to an opening region OP of the base or the first base (see FIG. 25). Therefore, by not forming an opening for applying the coupling member between the first base and the second base, it is possible to suppress the reduction of the coupling force between the first base and the second base and inhibit a reduction in the stiffness of the entire base.

In addition, an application groove 220g may be further included in a region adjacent to the base opening 220p. The application groove 220g may be in contact with the second base hole 220a. With this configuration, when a coupling member, such as epoxy is injected through the base opening 220p, the coupling member may move to the second base hole 220a along the application groove 220g. In addition, the injected coupling member may couple a lens in the second base hole 220a and the second base.

In addition, a plurality of application grooves 220g may be formed.

Figure 25:
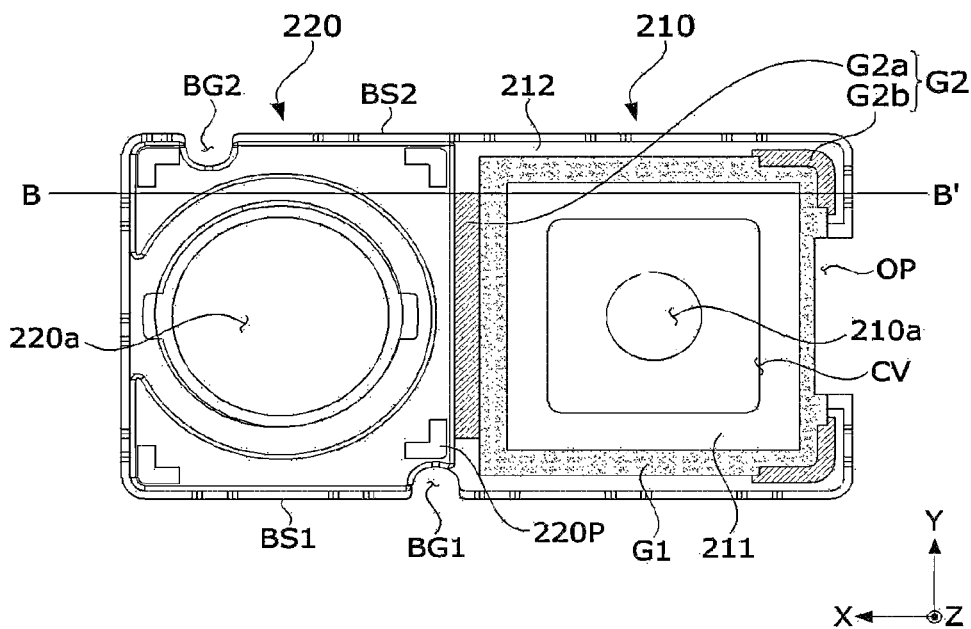
FIG. 25 is a top view of the base of the camera device according to the embodiment.
Figure 26:
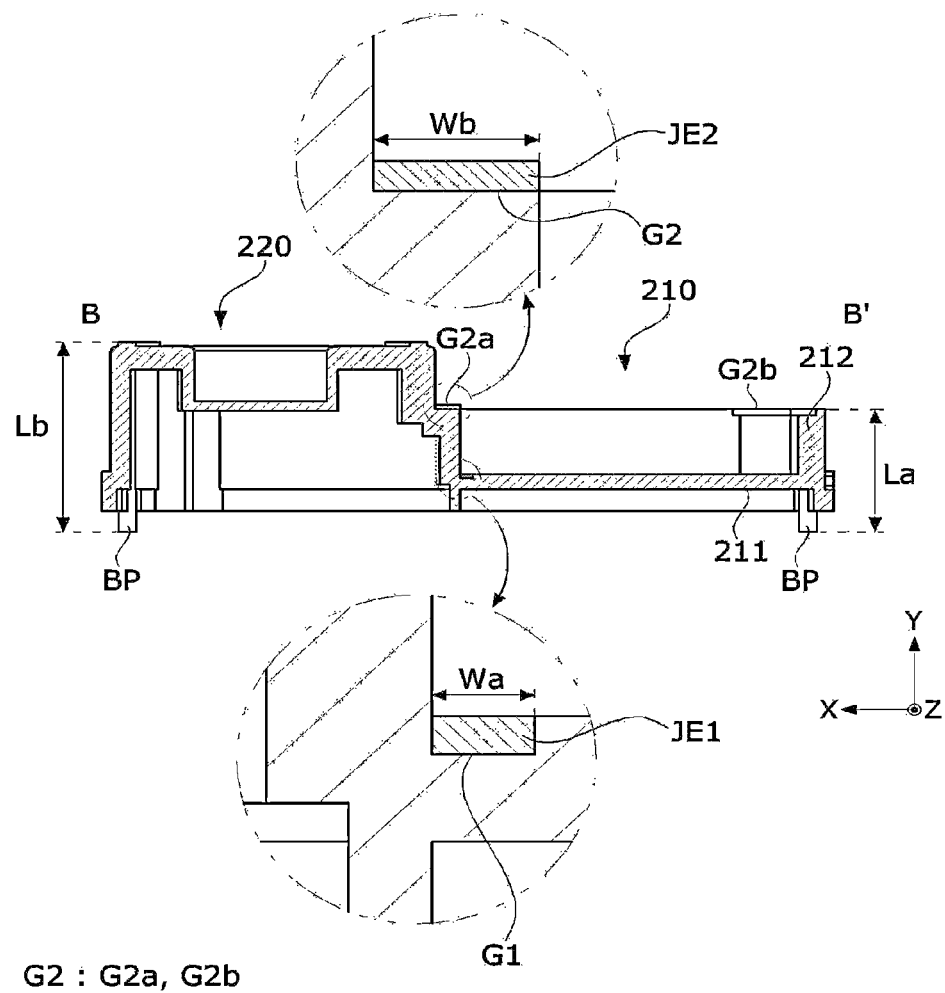
FIG. 26 is a cross-sectional view along line B-B' in FIG. 25.

FIG. 25 is a top view of the base of the camera device according to the embodiment, and FIG. 26 is a cross-sectional view along line B-B' in FIG. 25.

Referring to FIGS. 25 and 26, the first groove G1 may be located in the upper surface of the body 211. In addition, the first groove G1 may be located inside the side wall 212. Therefore, as described above, the first groove G1 may be disposed along the edge of the cavity CV.

In addition, the second groove G2 may be located in the upper surface of the side wall 212. The second groove G2 may include a 2-1 groove G2a and a 2-2 groove G2b.

For example, the 2-1 groove G2a may extend from the upper surface of the side wall 212 in the second direction (Y-axis direction). Unlike the 2-2 groove G2b, the 2-1 groove G2a may not be bent.

The 2-2 groove G2b may be disposed in a portion bent from an edge of the side wall. Therefore, the 2-2 groove G2b may also be bent. In addition, a plurality of 2-2 grooves G2b may overlap in the second direction (Y-axis direction). Alternatively, the 2-2 grooves G2b may be symmetrically disposed with respect to the first direction (X-axis direction).

In addition, the 2-1 groove G2a and the 2-2 groove G2b may not at least partially overlap in the first direction (X-axis direction). With this configuration, the housing (or the components of the light emitting unit, such as the first optical part and the first lens barrel) may be seated on the first base 210, and the coupling force with the first base 210 may be increased, thereby suppressing separation between the housing and the first base 210 caused by an external impact.

In addition, as described above, a first bonding member JE1 may be positioned in the first groove G1. In addition, a second bonding member JE2 may be positioned in the second groove G2. A portion of the second bonding member JE2 may be positioned along an inner surface of the side wall 212. Therefore, a portion of the inner surface of the side wall and the outer surface of the housing may be coupled through the second bonding member JE2 by the above-described correction to the optical axis displacement. Therefore, it is possible to further increase the coupling force between the housing and the first base 210.

In addition, the side wall 212 may have the opening region OP. The opening region OP may be positioned in a portion of the side wall 212. For example, the opening region OP may be positioned in a region facing the third housing side portion. Therefore, it is possible to easily secure a space for arranging the side substrate.

Furthermore, the first groove G1 may have an exposed region by the opening region OP. In other words, only a partial region of the first groove G1 may be surrounded by the side wall 212. In addition, the side wall 212 may have an open loop shape on the XY plane. Therefore, even when the first bonding member JE1 is excessively applied in the first groove G1, the first bonding member JE1 may move to the exposed region or the opening region OP. Therefore, it is possible to inhibit the first bonding member JE1 from moving to the base hole 210a. In other words, it is possible to inhibit a phenomenon that the first bonding member JE1 blocks the light emitted by the light source, thereby increasing the accuracy of the distance measurement.

In addition, a height La of the first base in the optical axis direction or the vertical direction may be different from a height Lb of the second base in the optical axis direction. For example, the height La of the first base 210 in the vertical direction (Z-axis direction) may be smaller than the height Lb of the second base 220 in the vertical direction (Z-axis direction). With this configuration, it is possible to easily secure a space in which the first optical part and the first lens module may move in the optical axis direction (Z-axis direction) by the driving unit. Therefore, it is possible to easily change the shape of the output light (planar light source or point light source) according to the distance to the object.

In addition, in an embodiment, a width Wa of the first groove G1 may be the same as or different from a width Wb of the second groove G2. For example, the width Wa of the first groove G1 may be greater than the width Wb of the second groove G2. Therefore, even when the second bonding member JE2 overflows and moves to the first groove G1, the first groove G1 may easily accommodate the second bonding member JE2. Furthermore, by improving the coupling force between the lower surface of the housing and the first base, it is possible to inhibit the separation between the housing and the first base even when the first optical part and the first lens module move in the third direction (vertical direction). The width may be a length in the first direction or the second direction.

In other words, the second groove G2 may partially overlap the housing side portion in the vertical direction (Z-axis direction). In other words, the second groove G2 may have an irradiation region in which the second groove G2 does not overlap the housing side portion in the vertical direction (Z-axis direction). A specific description thereof will be made below.

In addition, the base 200 may further include a base protrusion BP protruding downward from the bottom surface thereof. The base protrusion BP may be inserted into the groove corresponding to the above-described main substrate. Therefore, the base and the main substrate may be aligned and coupled.

In addition, the base 200 may include a first base side surface BS1 and a second base side surface BS2 facing each other. The first base side surface BS1 may include a first base groove BG1 passing through at least a portion of the lower surface thereof. In addition, the second base side surface BS2 may include a second base groove BG2 passing through at least a portion of the lower surface thereof.

In addition, the first base groove BG1 and the second base groove BG2 may be located in surfaces opposite to each other. Therefore, as will be described below, it is possible to increase a coupling force between the cover and the base 200 by cover pins disposed in the first base groove BG1 and the second base groove BG2. Furthermore, when an electrical connection is made between the main substrate and the cover pin as a ground, an electrical connection distance may increase as much as a separation distance between the first base groove BG1 and the second base groove BG2. Therefore, it is possible to enhance an electrical shielding function (blocking or the like.) through the cover. Furthermore, it is also possible to easily secure a heat-dissipation function through the cover.

In addition, the second base 220 may further include a base upper protrusion 220p disposed on an upper surface thereof. A plurality of base upper protrusions 220p may be formed and positioned on an uppermost portion of the base 200. Therefore, the base upper protrusion 220p may support the cover 400 to be described below. The base upper protrusion 220p may be flat. In other words, the plurality of base upper protrusions 220p may have the same surface. For example, the base upper protrusion 220p may have a predetermined coarseness or roughness or less. With this configuration, a supporting force of the base 200 for the cover 400 may be made uniform.

Figure 27:
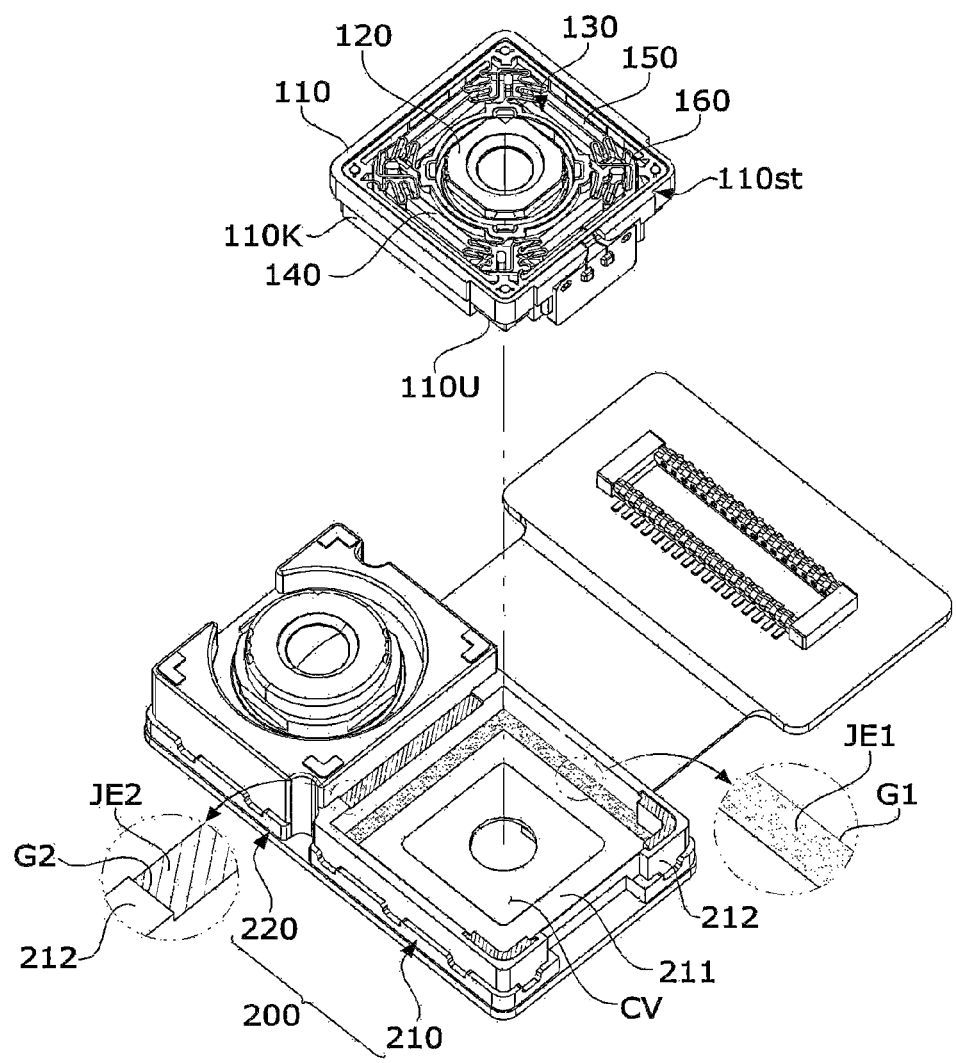
FIG. 27 is a view showing coupling between the base and components of the light emitting unit in the camera device according to the embodiment.
Figure 28:
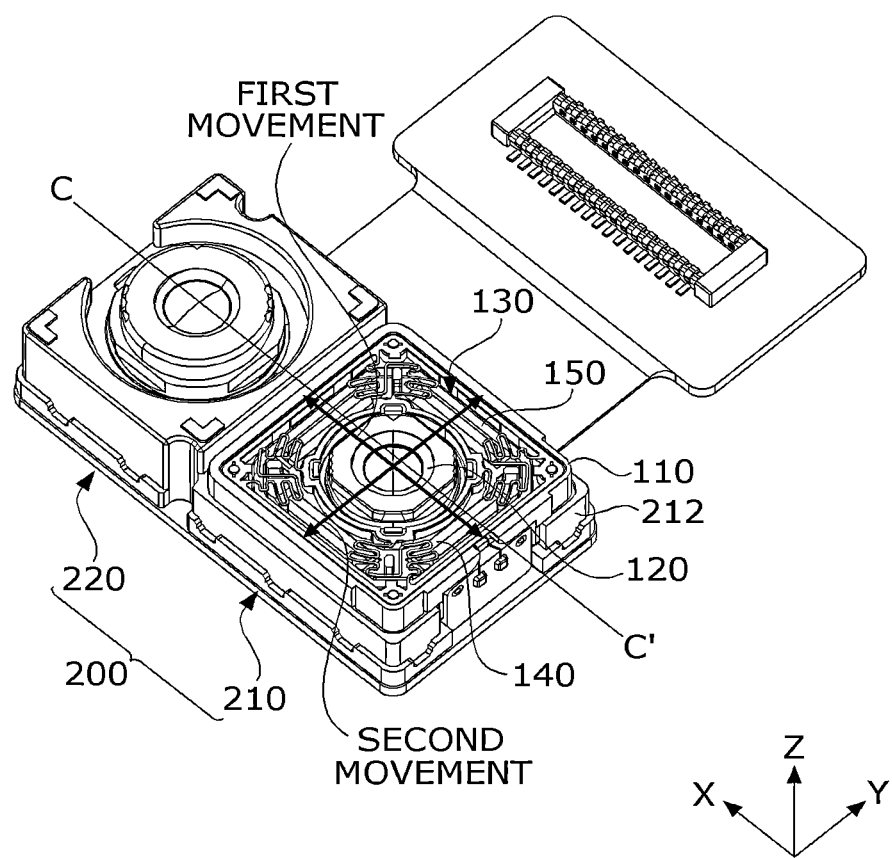
FIG. 28 is a view showing optical axis correction in the camera device according to the embodiment.
Figure 29:
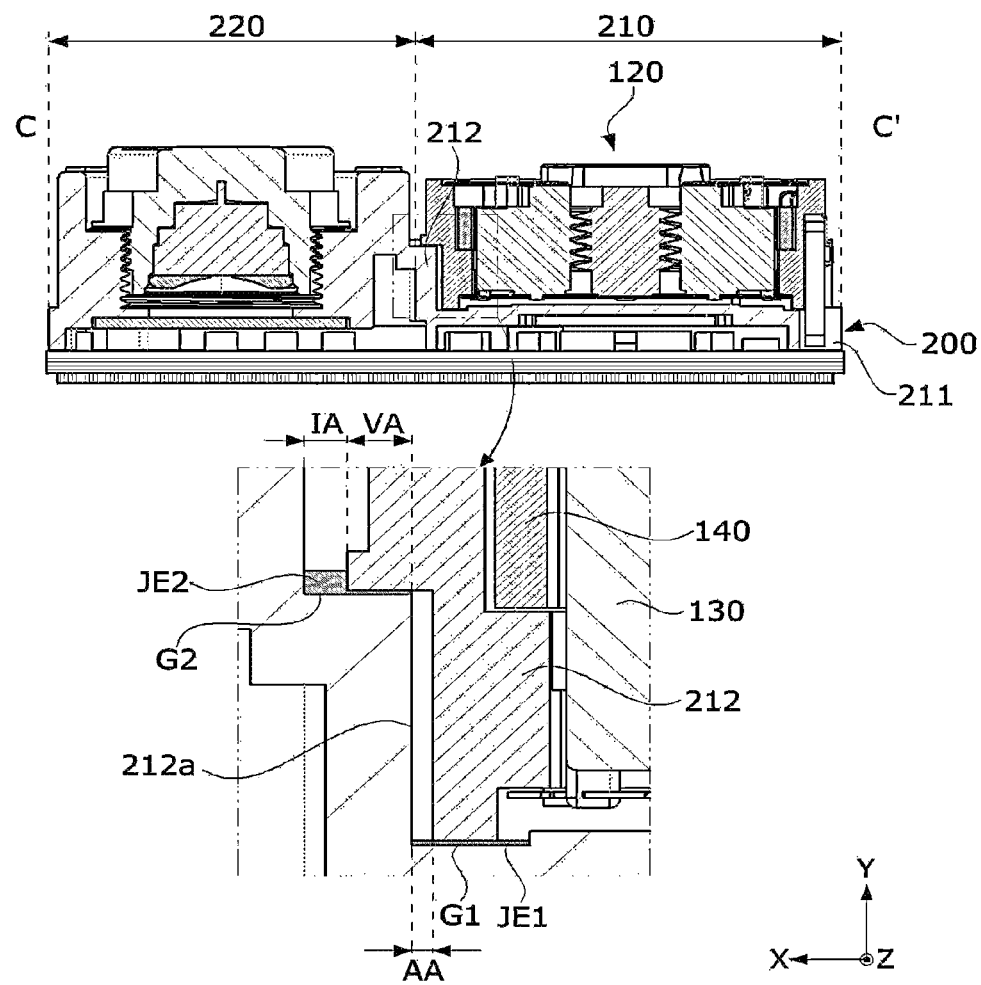
FIG. 29 is a cross-sectional view along line C-C' in FIG. 28.

FIG. 27 is a view showing coupling between the base and components of the light emitting unit in the camera device according to the embodiment, FIG. 28 is a view showing optical axis correction in the camera device according to the embodiment, and FIG. 29 is a cross-sectional view along line C-C' in FIG. 28.

Referring to FIGS. 27 and 28, the housing 110 may include a housing bottom surface 110U and the housing side portion 110k (the above-described first to fourth housing side portions).

In addition, before the housing 110 (or the components of the light emitting unit, such as the first optical part 120 and the first lens barrel 130) is seated on the first base 210, the first bonding member JE1 may be applied in the first groove G1. In addition, the second bonding member JE2 may also be applied in the second groove G2.

In addition, the housing bottom surface 110U may be accommodated in the cavity CV and seated on the body 211 of the first base 210. In other words, the housing bottom surface 110U of the housing may be in contact with the upper surface of the body 211 and may also be in contact with the first bonding member JE1.

In addition, the housing side portion 110k may be seated in the second groove G2 and on the side wall 212. The housing side portion 110k may have a stepped portion to be seated in the second groove G2 and on the side wall 212. The stepped portion corresponds to the side wall protrusion 212st. For example, since a bottom surface of the second groove G2 is positioned under the upper surface of the side wall 212, a region of the housing side portion 110k seated in the bottom surface of the second groove G2 may be positioned under a region of the housing side portion 110k in contact with the upper surface of the side wall 212. As described above, the housing side portion 110k may have the stepped portion according to a height difference between the region seated on the bottom surface of the second groove G2 and the region in contact with the upper surface of the side wall 212.

In addition, in the camera device according to the embodiment, after the coupling between the first base 210 and the housing (or the components of the light emitting unit, such as the first optical part and the first lens barrel), the housing (or the components of the light emitting unit, such as the first optical part and the first lens barrel) may move in the first direction (X-axis direction) (e.g., "first movement") by the fluidity of the first bonding member JE1 and the second bonding member JE2 in a state of being seated on the first bonding member JE1 and the second bonding member JE2. In addition, the housing (or the components of the light emitting unit, such as the first optical part and the first lens barrel) may move in the second direction (Y-axis direction) (e.g., "second movement") by the fluidity of the first bonding member JE1 and the second bonding member JE2 in a state of being seated on the first bonding member JE1 and the second bonding member JE2. Therefore, the housing (or the components of the light emitting unit, such as the first optical part and the first lens barrel) may perform the first movement or the second movement in the first base 210, and thus the correction to the optical axis displacement in the third direction (Z-axis direction or optical axis direction) may be performed.

Referring to FIG. 29, as described above, the second groove G2 may partially overlap the housing side portion of the housing 110 in the vertical direction (or the third direction). Therefore, the second groove G2 may have a non-irradiated region VA overlapping the housing 110 in the vertical direction (or the third direction). In addition, the second groove G2 may have the non-irradiated region VA and an irradiated region IA spaced apart from the non-irradiated region VA. In other words, the irradiated region IA may be a region in which the second groove G2 and the housing 110 do not overlap in the vertical direction (or the third direction).

The second groove G2 may have the non-irradiated region VA, and thus after the above-described correction to the optical axis displacement (optical axis alignment by the first movement or the second movement) is performed, light radiation to the second bonding member JE2 may be easily performed. For example, ultraviolet rays are radiated through the irradiated region IA, and thus the second bonding member JE2 may be rapidly cured. Therefore, the housing 110 and the first base 210 may be coupled in an aligned state (state in which the optical axes have been aligned).

In this case, a minimum distance in a region (irradiated region IA) in which the second groove G2 and the housing side portion do not overlap in the vertical direction (or the third direction) in a horizontal direction may be greater than a minimum distance AA between the inner surface 212a of the side wall 212 and the housing 110 in the horizontal direction. Here, the horizontal direction may be the first direction (X-axis direction) or the second direction (Y-axis direction).

With this configuration, it is possible to not only easily secure a distance due to the optical axis displacement but also easily secure a light irradiation space for curing the second bonding member JE2 at the same time.

In addition, the minimum distance in the region (irradiated region IA) in which the second groove G2 and the housing side portion do not overlap in the vertical direction (or the third direction) in the horizontal direction may correspond to a length of the irradiated region IA in the horizontal direction.

In addition, the minimum distance AA between the inner surface 212a of the side wall 212 and the housing 110 in the horizontal direction may correspond to a minimum distance at which the housing 110 or the like in the first base 210 may perform the first movement or the second movement to correct the above-described optical axis displacement.

Figure 30:
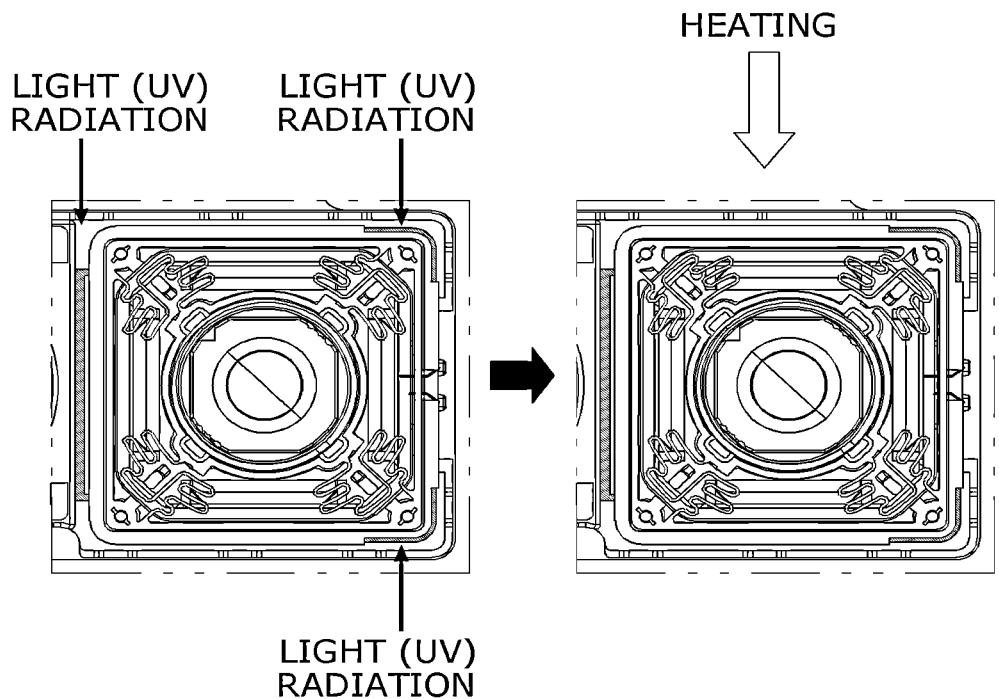
FIG. 30 is a view showing the coupling between the base and the light emitting unit in the camera device according to the embodiment.

FIG. 30 is a view showing the coupling between the base and the light emitting unit in the camera device according to the embodiment.

Referring to FIG. 30, as the housing (or the components of the light emitting unit, such as the first optical part and the first lens barrel) is moved (e.g., the first movement and the second movement), the correction to the optical axis displacement may be performed for light emission on the first base.

Thereafter, light (e.g., ultraviolet rays (UV)) may be radiated to the second groove to primarily couple the housing and the first base. At this time, the ultraviolet rays may be radiated to the above-described irradiated region IA. Therefore, the second bonding member located in the irradiated region IA may be cured to easily couple the housing and the first base. Therefore, the first base and the housing may be rapidly coupled after the optical axes are aligned (e.g., after the first movement or the second movement is performed), and thus it is possible to suppress the occurrence of additional optical axis displacement.

In addition, it is possible to further increase the coupling force between the housing and the first base by curing the first bonding member (or the second bonding member) through heating. For example, the first bonding member may be cured by heat, and the second bonding member may be re-cured by heat after cured by light radiation. Therefore, internal structures of the first bonding member and the second bonding member may be different. However, the present invention is not limited thereto.

In addition, with this configuration, it is possible to easily align the position of the housing (or the components of the light emitting unit, such as the first optical part and the first lens barrel) on the first base and inhibit additional optical axis displacement caused by an impact or the like after the optical axis displacement is corrected.

In addition, it is possible to increase the coupling force between the housing and the first base, thereby suppressing a separation phenomenon between the housing and the first base due to an impact or the like in the camera device. Therefore, it is possible to secure the eye-safety of an object (e.g., a person) for the light emitted from the light source.

Figure 31:
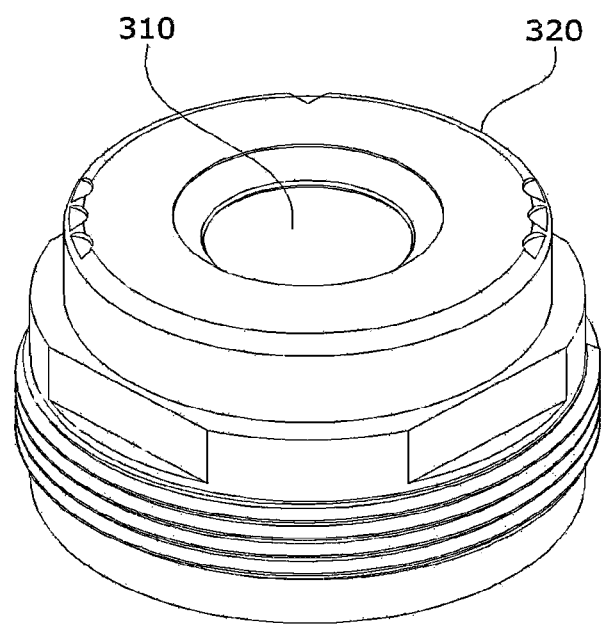
FIG. 31 is a view showing a second optical part and a second lens barrel of a light receiving unit according to the embodiment.
Figure 32:
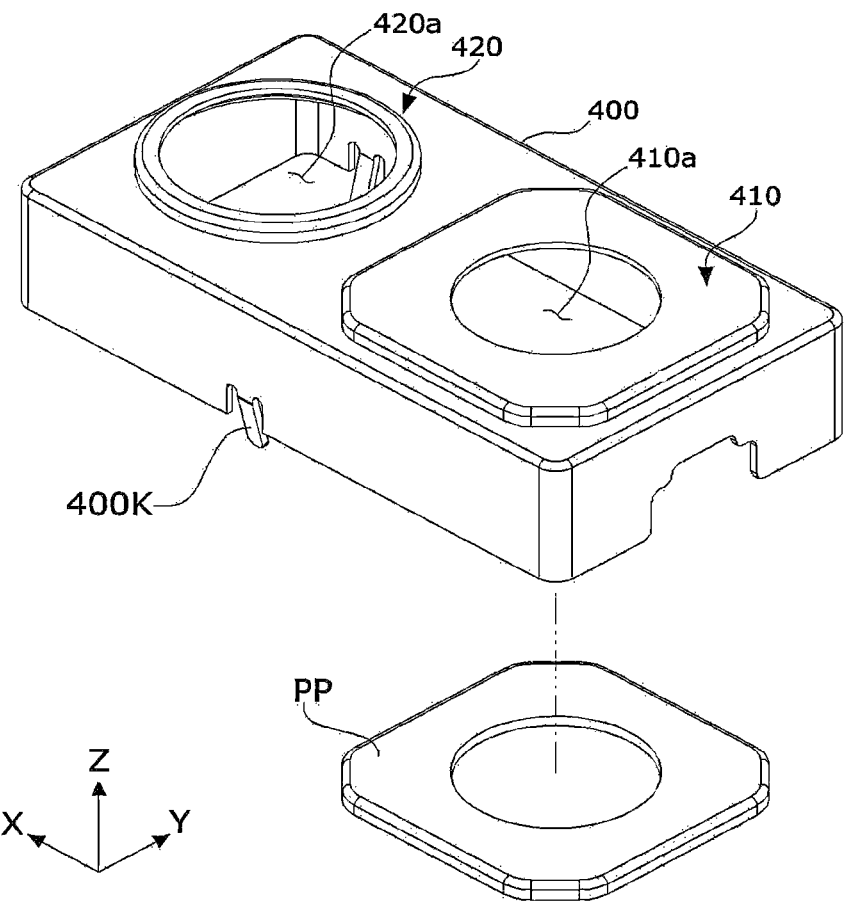
FIG. 32 is a view showing a cover of the camera device according to the embodiment.

FIG. 31 is a view showing a second optical part and a second lens barrel of a light receiving unit according to the embodiment, and FIG. 32 is a view showing a cover of the camera device according to the embodiment.

Referring to FIGS. 31 and 32, the second optical part 310 may be coupled to the second lens barrel 320. The second optical part 310 may be inserted into a hole positioned at the center of the second lens barrel 320. In addition, the second lens barrel 320 may have a screw thread on an outer surface thereof and may be screw-coupled to the second base 220 of the base 200.

The second optical part 310 may be formed of a plurality of lenses. The second optical part 310 may have the same structure as the above-described first optical part or optical part.

In an embodiment, the cover 400 may surround the base. In addition, the cover 400 may include a first cover part 410 and a second cover part 420 other than the above description.

The first cover part 410 may be positioned on the first base and may include a first cover hole 410a overlapping the first optical part. An optical signal (output light) passing through the first optical part through the first cover hole 410a may be radiated to the object.

The second cover part 420 may be positioned on the second base and may include a second cover hole 420a overlapping the second optical part. An optical signal (reflected light) passing through the second optical part through the second cover hole 420a may be radiated to the image sensor.

As described above, the cover 400 may include a cover pin 400K disposed on a side surface thereof. The cover pin 400K may extend or may be bent inward. With this configuration, the cover pin 400K may be positioned in the first base groove and the second base groove as described above. Therefore, it is possible to increase a coupling force between the cover 400 and the base, thereby inhibiting the cover 400 from being separated from the base.

Furthermore, the cover 400 may perform electrical shielding as a ground. To this end, the cover pin 400K and the main substrate may be electrically connected.

In addition, the cover 400 according to the embodiment may include a blocking member PP overlapping the housing in the vertical direction (or the third direction) on the first base. The blocking member PP may inhibit ferromagnetic of the magnet of the driving magnet part 140 from occurring in response to light (e.g., ultraviolet rays) radiation. In addition, the first cover part 410 may have an extension partially protruding upward. In addition, the blocking member PP may be disposed on the extension.

Figure 33:
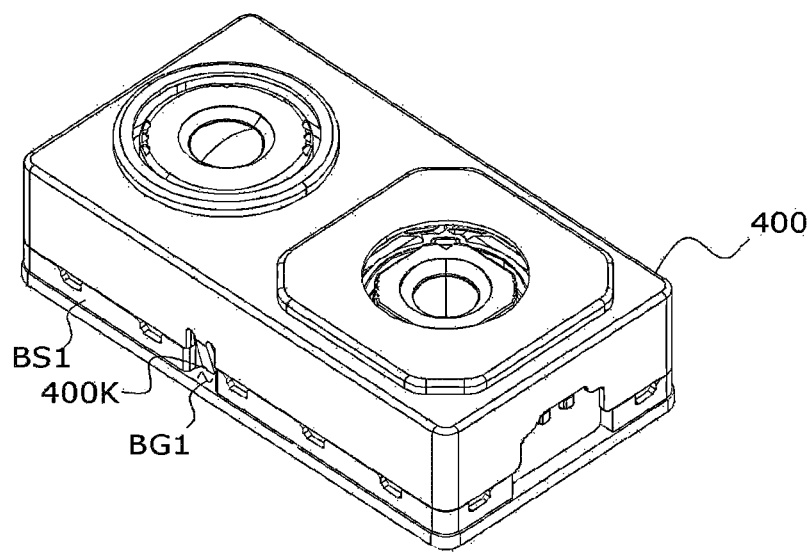
FIG. 33 is a perspective view of the camera device equipped with the cover according to the embodiment.
Figure 34:
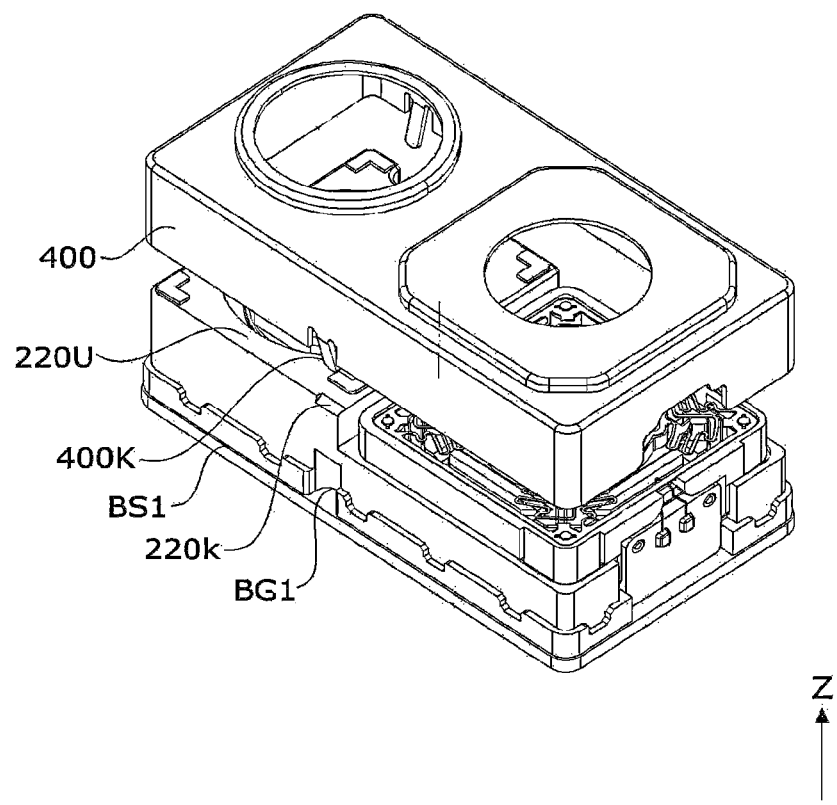
FIG. 34 is a view showing a cover and a base according to a modified example.

FIG. 33 is a perspective view of the camera device equipped with the cover according to the embodiment and FIG. 34 is a view showing a cover and a base according to a modified example.

Referring to FIG. 33, the base according to the embodiment may include the first base side surface BS1 and the second base side surface opposite to each other as described above.

First, the first base side surface BS1 may include the first base groove BG1 passing through the base from the side surface of the base. The second base groove may pass through a lower surface of the second base side surface.

In addition, the first base groove BG1 and the second base groove BG2 may be displaced from each other. For example, the first base groove BG1 and the second base groove BG2 may not overlap in the first direction or the second direction. Alternatively, the first base groove BG1 and the second base groove BG2 may not overlap each other in directions perpendicular to the side surface of the first base and the side surface of the second base.

In addition, any one of the first base groove BG1 and the second base groove BG2 may be disposed at a position corresponding to an interface between the first base and the second base. In addition, the other one of the first base groove BG1 and the second base groove BG2 may be disposed in the second base. Therefore, the base may have an increased coupling force with the cover 400 and may be electrically protected through the cover 400.

In addition, the cover pin 400K of the cover 400 may extend or may be bent inward and may be positioned in the first base groove BG1. Therefore, the cover pin 400K may be protected by the first base groove BG1. In addition, when the cover pin 400K is electrically connected to the main substrate through solder or the like, a space for arranging the solder may be secured.

Referring to FIG. 34, in the base according to the modified example, the first base groove BG1 or the second base groove may partially pass through the base from the lower surface of the base. In addition, the cover pin 400K may be disposed in the first base groove BG1 as described above. In this case, since the first base groove BG1 is recessed in a part of the base from the lower surface, it is possible to increase the coupling force between the cover pin 400K and the base. In other words, it is possible to block the cover pin 400K from moving up due to the upper surface of the first base groove BG1. Therefore, it is possible to inhibit a phenomenon that the cover 400 or the housing is separated from the base due to an impact or the like.

Furthermore, a base inclined surface 220k may be positioned above the first base groove BG1. In other words, the second base or the base may include the base inclined surface 220k. The base inclined surface 220k may be positioned on an upper surface 220U of the second base. In addition, the base inclined surface 220k may be positioned to overlap the first base groove BG1 in the vertical direction (Z-axis direction). The base inclined surface 220k may be chamfered. With this configuration, the cover pin 400k is first in contact with the base inclined surface 220k before seating in the first base groove BG1, and thus the cover pin 400k may be seated in the first base groove BG1 without damage. In other words, the cover pin 400k may move downward along the side surface of the second base without a large resistance along the base inclined surface 220k and may finally be positioned in the first base groove BG1. Therefore, it is possible to increase the durability of the cover pin 400k.

Figure 35:
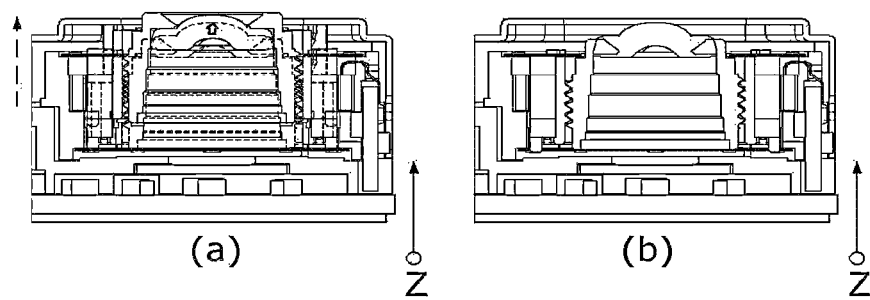
FIG. 35 is a view showing movement of the first optical part and a first lens module in the light emitting unit according to the embodiment.
Figure 36:
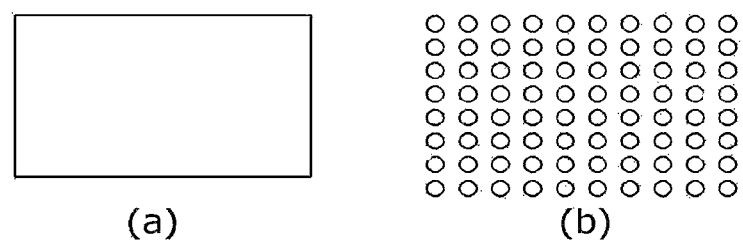
FIG. 36 is a view showing a shape of an optical signal according to the movement of the first optical part and the first lens module.
Figure 37:
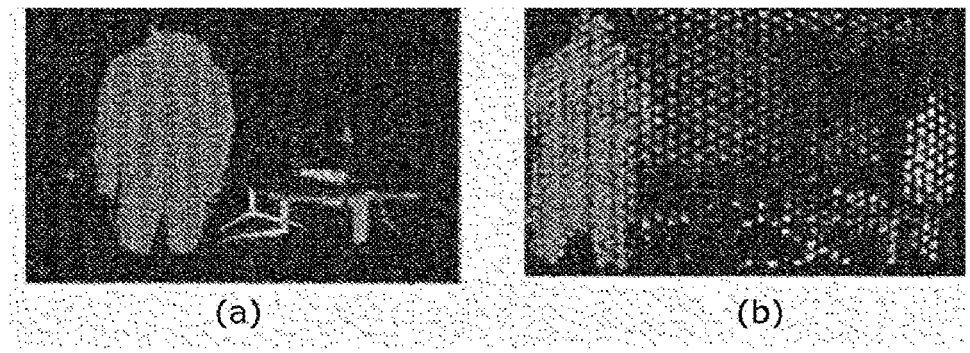
FIG. 37 is a view showing an example of an image of the light receiving unit according to the movement of the first optical part and the first lens module.

FIG. 35 is a view showing movement of the first optical part and the first lens module in the light emitting unit according to the embodiment, FIG. 36 is a view showing a shape of an optical signal according to the movement of the first optical part and the first lens module, and FIG. 37 is a view showing an example of an image of the light receiving unit according to the movement of the first optical part and the first lens module.

Referring to FIGS. 35 to 37, the first optical part and the first lens module according to the embodiment may move in the vertical direction so that the optical signal (output light) may be converted into a planar light source or a point light source.

In other words, the output light may be output in the form of a plane pattern or a plurality of points according to the distance between the light source and the first lens module (or the first optical part and/or the second optical part) (hereinafter used interchangeably with the optical part).

In an embodiment, the first optical part and the first lens module may move in the optical axis direction (Z-axis direction) by the driving unit. In addition, as described above, an amount of upward movement of the first optical part and the first lens module may be adjusted according to an amount of current flowing through the driving coil part.

For example, in the camera device according to the embodiment, the first optical part and the first lens module may move so that the distance from the light source is from the maximum (see FIG. 35A) to the minimum (see FIG. 35B). Specifically, the above-described distance between the light source and the optical part (first optical part) may be a distance between an uppermost surface of the aperture of the light source and a lowermost surface of the optical part. In addition, when the distance between the uppermost surface of the aperture of the light source and the lowermost surface of the optical part is smaller than or equal to a predetermined distance (e.g., 80 μm), light is output in a point shape. In addition, when the distance between the uppermost surface of the aperture of the light source and the lowermost surface of the optical part is greater than or equal to a predetermined distance (e.g., 530 μm), light may be output in a planar shape.

In other words, the controller may control the amount of current provided to the driving coil part to adjust the distance between the first lens module (or the first optical part) and the light source, and finally control the shape (planar light source or point light source) of the output light. For example, the controller may change the amount of movement of the first lens module by an actuator when the amount of current provided to the driving coil part is changed (e.g., an increase or a decrease in a current value).

In an embodiment, when the distance between the light source and the first lens module (or the first optical part) is greater than or equal to a certain distance, the optical signal (output light) may be output in the form of the planar light source or in the planar shape as shown in FIGS. 36A and 37A. In other words, when the distance between the light source and the first lens module (or the first optical part) is a distance between a preset distance (or the certain distance) and a maximum distance, the optical signal (output light) may be output in the form of the planar light source or in the planar shape. Here, the maximum distance may be a distance when the distance between the light source and the movable first lens module is the maximum and may be a distance between the position of the first lens module and the light source when the actuator is maximally driven (e.g., a maximum current).

On the other hand, when the distance between the light source and the first lens module (or the first optical part) is smaller than or equal to the certain distance, the optical signal may be output in the form of the point light source or in the point shape as shown in FIGS. 36B and 37B. In other words, when the distance between the light source and the first lens module (or the first optical part) is a distance between the preset distance (or the certain distance) and the minimum distance, the optical signal may be output in the form of the point light source or in the point shape. Here, the minimum distance may be a distance when the distance between the light source and the movable first lens module (or the first optical part) is the minimum and may be a distance between the position of the first lens module (initial position) and the light source when the actuator is not driven.

In addition, an optical signal (output light) from the light source in a range of a predetermined distance or less may be output in the point shape as described above, and higher energy may be applied to an object.

The camera device 10 according to the embodiment of the present invention may change the light pattern of the output light from the planar light source to the point light source or change the resolution of the point light source according to the resolution of the output light, the distance to the object, the degree of power consumption, etc. and thus provide the advantage that it flexibly responds to the requirements of the various applications.

Figure 38:
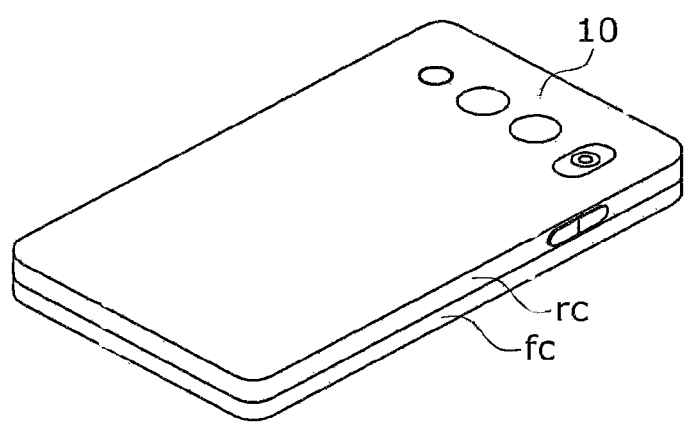
FIG. 38 is a view showing an optical device including the camera device according to the embodiment.

FIG. 38 is a view showing an optical device including the camera device according to the embodiment.

Referring to FIG. 38, the optical device according to the embodiment includes a front case fc, a rear case rc, and a camera device 10 provided on the front case fc or the rear case rc or between the front case fc and the rear case rc.

In addition, the camera device 10 may be the above-described camera device. Therefore, the optical device may capture a three-dimensional image through the camera device for outputting three-dimensional depth images.

Although embodiments have been mainly described above, these are only illustrative and do not limit the present invention, and those skilled in the art to which the present invention pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present invention defined in the appended claims.

What is claimed is:

1. A distance measuring camera device comprising:
   a substrate;
   a light source and an image sensor disposed on the substrate;
   a first base disposed on the light source;
   a second base disposed on the image sensor;
   a housing coupled to the first base; and
   an optical part disposed in the housing,
   wherein the first base includes a bottom portion and a side wall disposed on the bottom portion, and
   the distance measuring camera device includes a first bonding member disposed between the bottom portion and the housing, and a second bonding member spaced apart from the first bonding member in an optical axis direction of the light source and disposed between the side wall and the housing.

2. The distance measuring camera device of claim 1, wherein the bottom portion includes a first groove disposed along an edge of a cavity of the first base, and
wherein the side wall includes a second groove in which the housing is seated.

3. The distance measuring camera device of claim 2, wherein the first groove is disposed closer to an optical axis of the light source than the second groove is.

4. The distance measuring camera device of claim 2, wherein a width of the first groove is different from a width of the second groove.

5. The distance measuring camera device of claim 2, wherein the housing includes a housing bottom surface, and a housing side portion disposed on the housing bottom surface and including a stepped portion,
wherein the housing bottom surface is disposed in the first groove, and
wherein the stepped portion is seated in the second groove and on the side wall.

6. The distance measuring camera device of claim 5, wherein a portion of the second groove overlap the stepped portion in the optical axis direction.

7. The distance measuring camera device of claim 6, wherein a minimum distance in a region in which the second groove and the housing side portion do not overlap in the optical axis direction in a direction perpendicular to the optical axis is greater than a minimum distance between an inner surface of the side wall and the housing in the direction perpendicular to the optical axis.

8. The distance measuring camera device of claim 1, wherein the first base and the second base may be integrally formed.

9. The distance measuring camera device of claim 1, wherein a height of the first base in the optical axis direction is different from a height of the second base in the optical axis direction.

10. The distance measuring camera device of claim 1, wherein the second base includes a base opening located in a side surface thereof, a base hole disposed therein, and an application groove adjacent to the base opening to be in contact with the base hole.

11. The distance measuring camera device of claim 1, wherein the base includes a first base side surface and a second base side surface that are positioned opposite to each other,
wherein the first base side surface includes a first base groove concave toward the inside of the base, and
wherein the second base side surface includes a second base groove concave toward the inside of the base.

12. The distance measuring camera device of claim 11, wherein the first base groove and the second base groove do not overlap in a direction perpendicular to the first base side surface and the second base side surface.

13. The distance measuring camera device of claim 12, wherein any one of the first base groove and the second base groove is positioned corresponding to an interface between the first base and the second base, and
wherein the other one of the first base groove and the second base groove is positioned in the second base.

14. The distance measuring camera device of claim 1, wherein the second base includes a base upper protrusion disposed on an upper surface thereof.

15. The distance measuring camera device of claim 1, comprising a cover configured to cover the base.

16. The distance measuring camera device of claim 15, wherein the cover includes a blocking member overlapping the housing in the optical axis direction on the first base.

17. A distance measuring camera device comprising:
a substrate,
a light source and an image sensor disposed on the substrate,
a first base disposed on the light source,
a second base disposed on the image sensor,
a housing coupled to the first base, and
an optical part disposed in the housing,
wherein the first base includes a bottom portion and a side wall disposed on the bottom portion, and
wherein the housing includes a side surface on which a stepped portion is formed, and
comprising, a first bonding member disposed between the bottom portion and a lower surface of the housing, and a second bonding member disposed between the stepped portion and the side wall.

18. The distance measuring camera device of claim 17, wherein the optical part may move in an optical axis direction.

19. A distance measuring camera device comprising:
a substrate,
a light source disposed on the substrate,
a first base disposed on the light source,
a housing coupled to the first base, and
an optical part disposed in the housing,
wherein the first base includes a bottom portion and a side wall disposed on the bottom portion, and
wherein the housing includes a side surface on which a stepped portion is formed, and
comprising a first bonding member configured to bond between the bottom portion and a lower surface of the housing, and a second bonding member configured to bond between the stepped portion and the side wall.

20. The distance measuring camera device of claim 19, wherein the optical part may move in an optical axis direction.

* * * * *